(12) United States Patent
Kondo et al.

(10) Patent No.: US 8,144,779 B2
(45) Date of Patent: Mar. 27, 2012

(54) APPARATUS AND METHOD FOR DETECTING MOTION VECTOR, PROGRAM, AND RECORDING MEDIUM

(75) Inventors: Tetsujiro Kondo, Tokyo (JP); Tsutomu Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1385 days.

(21) Appl. No.: 11/733,945

(22) Filed: Apr. 11, 2007

(65) Prior Publication Data

US 2008/0019447 A1 Jan. 24, 2008

(30) Foreign Application Priority Data

Jun. 19, 2006 (JP) ................................. 2006-168967

(51) Int. Cl.
*H04N 7/12* (2006.01)
(52) U.S. Cl. ............... 375/240.16; 375/240; 375/240.12
(58) Field of Classification Search .............. 375/240.16
See application file for complete search history.

(56) References Cited

U.S. PATENT DOCUMENTS 4,691,230 A * 9/1987 Kaneko et al. ................. 348/699
5,576,772 A * 11/1996 Kondo ........................... 348/699

FOREIGN PATENT DOCUMENTS

| JP | 7-67104 A | 3/1995 |
| JP | 7-154801 A | 6/1995 |
| JP | 7-222170 A | 8/1995 |
| JP | 2005-175870 | 6/2005 |

OTHER PUBLICATIONS

Japanese Office Action issued on Feb. 1, 2011 in corresponding Japanese Application No. 2006-168967.

* cited by examiner

*Primary Examiner* — Ponnoreay Pich
(74) *Attorney, Agent, or Firm* — Oblon, Spivak, McClelland, Maier & Neustadt, L.L.P.

(57) ABSTRACT

A motion vector detecting apparatus includes a first generation unit that generates a first evaluation value table from an image signal of a first level, a second generation unit that generates a second evaluation value table from an image signal of a second level higher than the first level, a correction unit that corrects the first evaluation value table on the basis of the second evaluation value table, a first extraction unit that extracts first candidate vectors using the first evaluation value table, a second extraction unit that extracts second candidate vectors using the corrected first evaluation value table, and a detection unit that detects a motion vector from the first and second candidate vectors.

8 Claims, 28 Drawing Sheets

FIG. 2
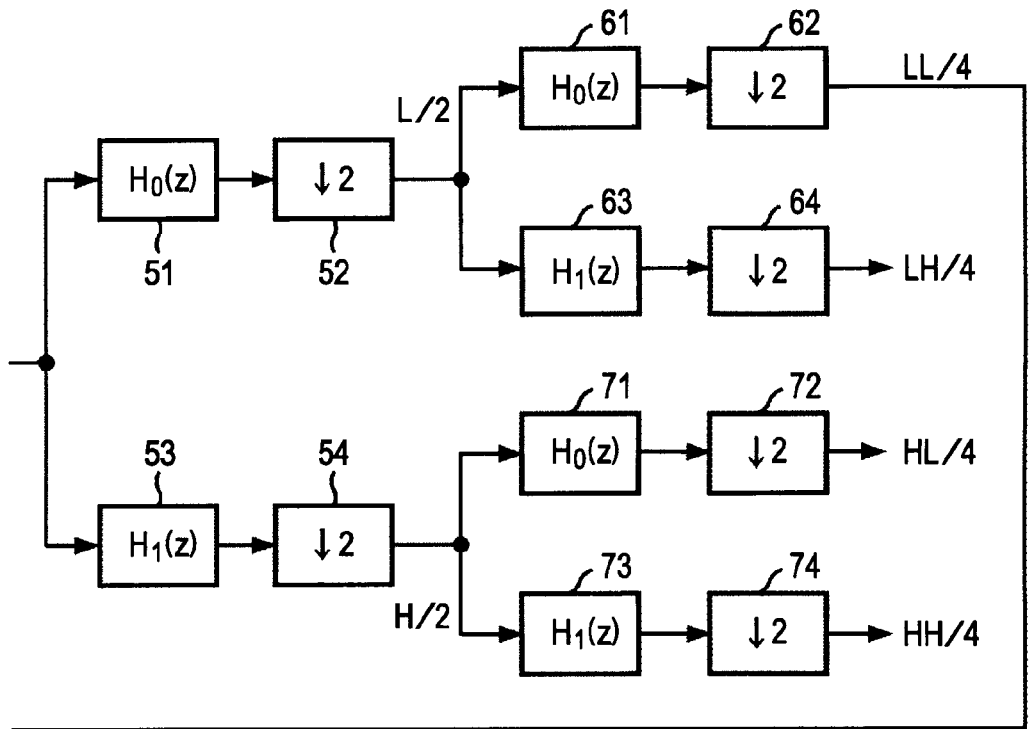
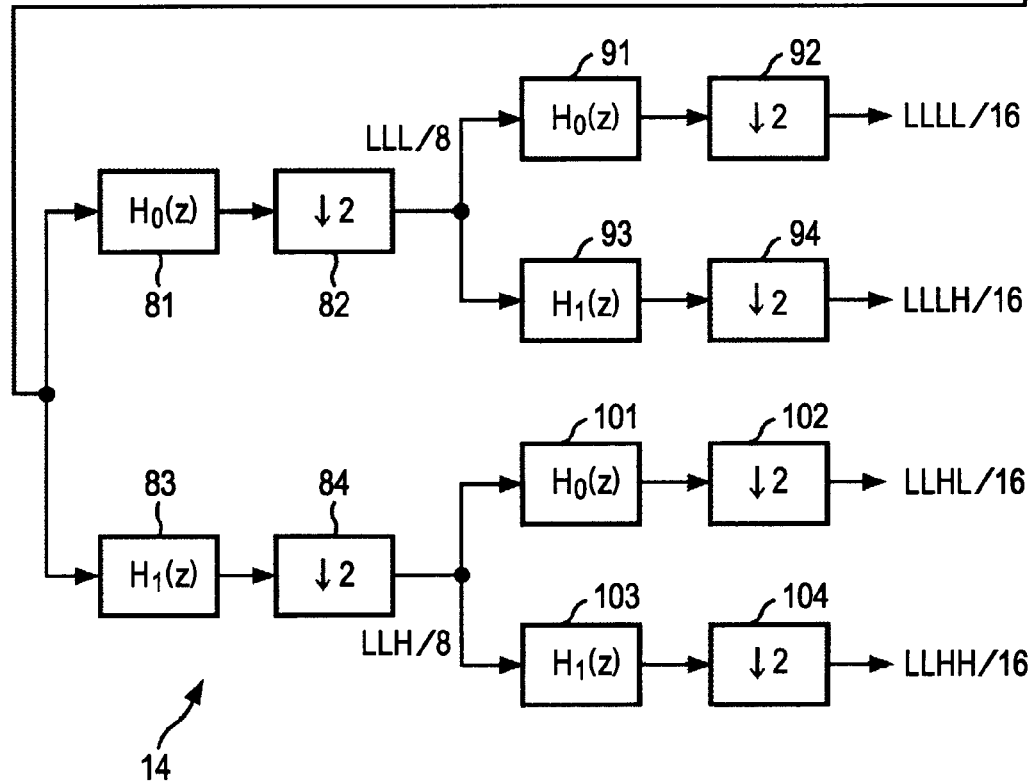

ORIGINAL IMAGE

LEVEL 1

LEVEL 2

LOWER LEVEL

HIGHER LEVEL

○: TOTAL OF 64 CANDIDATE VECTORS
(TOP 32 CANDIDATE VECTORS EXTRACTED USING
LOWER LEVEL EVALUATION VALUE TABLE CORRECTED
BASED ON HIGHER LEVEL EVALUATION VALUE TABLE
AND TOP 32 CANDIDATE VECTORS EXTRACTED USING
ONLY LOWER LEVEL EVALUATION VALUE TABLE)

✳: TOP 128 CANDIDATE VECTORS EXTRACTED USING
ONLY LOWER LEVEL EVALUATION VALUE TABLE

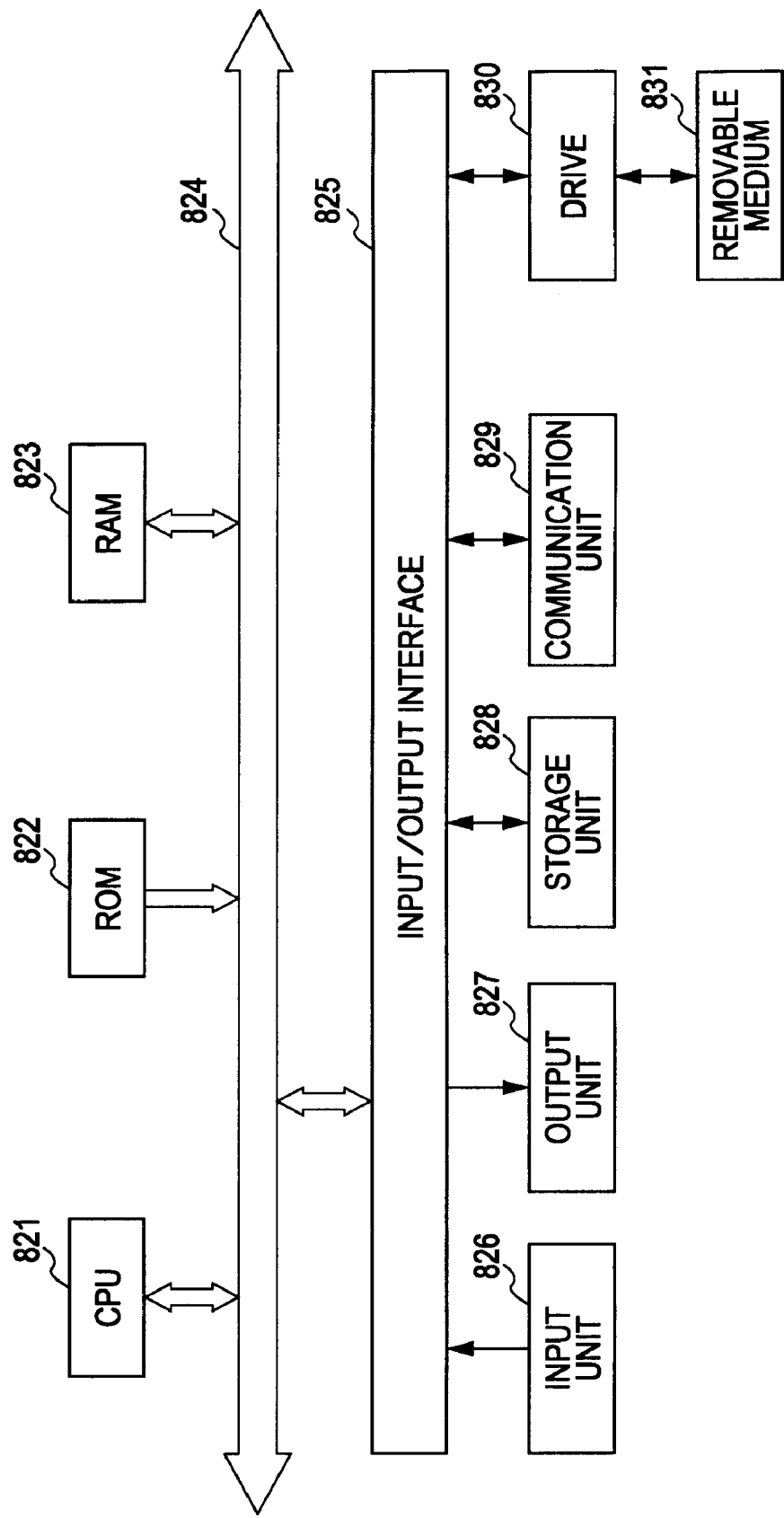

APPARATUS AND METHOD FOR DETECTING MOTION VECTOR, PROGRAM, AND RECORDING MEDIUM

CROSS REFERENCES TO RELATED APPLICATIONS

The present invention contains subject matter related to Japanese Patent Application JP 2006-168967 filed in the Japanese Patent Office on Jun. 19, 2006, the entire contents of which are incorporated herein by reference.

BACKGROUND OF THE INVENTION

1. Field of the Invention

The present invention relates to an apparatus and method for detecting a motion vector, a program, and a recording medium, and in particular, to a motion vector detecting apparatus and method capable of detecting a motion vector which is not detected even when the number of candidate vectors is increased, a program therefor, and a recording medium with the program recorded.

2. Description of the Related Art

In motion compensation image coding for high efficiency coding of moving image signals, traffic monitoring systems, and visual sensors, processing of detecting a moving object needs a process of detecting the direction of motion of an object included in an image and the size of the object, i.e., detecting a motion vector. A method of efficiently and accurately detecting a motion vector in units of pixels is disclosed in Japanese Unexamined Patent Application Publication No. 2005-175870 assigned to the same assignee as this application.

According to this method, the previous frame image signal is divided into a plurality of blocks each including m×n pixels and a pixel located in, for example, the center of each block is set to a representative point. A search area is set in the current frame. The difference between each representative point and each of pixels in the search area is calculated as an evaluation value. The evaluation values corresponding to the number of pixels in the search area are obtained.

When each pixel is expressed by eight bits, each evaluation value is also expressed by eight bits. Each evaluation value is compared to a variable threshold, so that the evaluation value is degenerated into one bit. The evaluation values in one frame are accumulated such that each evaluation value is related to the corresponding pixel position in the search area, so that an evaluation value table having a size corresponding to the search area is generated. A motion vector is detected on the basis of a peak evaluation value in the evaluation value table.

SUMMARY OF THE INVENTION

In the above-described method, when the area of a moving object in a frame is small, evaluation values are not necessarily large. Unfortunately, even when the number of candidate vectors is increased, it is difficult to detect the motion vector of the object.

The present invention is made in consideration of the above-described circumstances and it is desirable to achieve detection of a motion vector which is not detected even when the number of candidate vectors is increased.

According to an embodiment of the present invention, an apparatus for detecting a motion vector includes the following elements. A first generation unit generates a first evaluation value table from an image signal of a first level. A second generation unit generates a second evaluation value table from an image signal of a second level higher than the first level. A correction unit corrects the first evaluation value table on the basis of the second evaluation value table. A first extraction unit extracts first candidate vectors using the first evaluation value table. A second extraction unit extracts second candidate vectors using the corrected first evaluation value table. A detection unit detects a motion vector from the first and second candidate vectors.

The apparatus may further include a relating unit that relates the size of the second evaluation value table to that of the first evaluation value table. The correction unit may correct the first evaluation value table using the second evaluation value table with the related size.

The correction unit may normalize the second evaluation value table and correct the first evaluation value table using the normalized second evaluation value table.

The relating unit may expand evaluation values of the second evaluation value table as evaluation values in neighbor pixel positions to perform relating.

The apparatus may further include an output unit that performs inverse wavelet transform on a wavelet-transformed image signal to output an image signal of the first level and that of the second level.

According to another embodiment of the present invention, a method for detecting a motion vector includes the steps of generating a first evaluation value table from an image signal of a first level, generating a second evaluation value table from an image signal of a second level higher than the first level, correcting the first level evaluation value table on the basis of the second evaluation value table, extracting first candidate vectors using the first evaluation value table, extracting second candidate vectors using the corrected first evaluation value table, and detecting a motion vector from the first and second candidate vectors.

According to this embodiment, the first evaluation value table is generated from an image signal of the first level and the second evaluation value table is generated from an image signal of the second level higher than the first level. The first evaluation value table is corrected on the basis of the second evaluation value table. The first candidate vectors are extracted using the first evaluation value table. The second candidate vectors are extracted using the corrected first evaluation value table. A motion vector is detected from the first and second candidate vectors.

According to further another embodiment of the present invention, a program allows a computer to perform the above-described steps.

According to still another embodiment of the present invention, a recording medium stores the program according to above-described embodiment.

As described above, according to the embodiments of the present invention, a motion vector can be detected. Particularly, a motion vector which is not detected even when the number of candidate vectors is increased can be detected. Consequently, the motion vector of a small-area moving object, which generally has low evaluation values and is difficult to detect, can be detected.

BRIEF DESCRIPTION OF THE DRAWINGS

FIG. 2 is a block diagram of the structure of a wavelet transform unit;

FIG. 30 is a block diagram of the structure of a computer.

Figure 1:
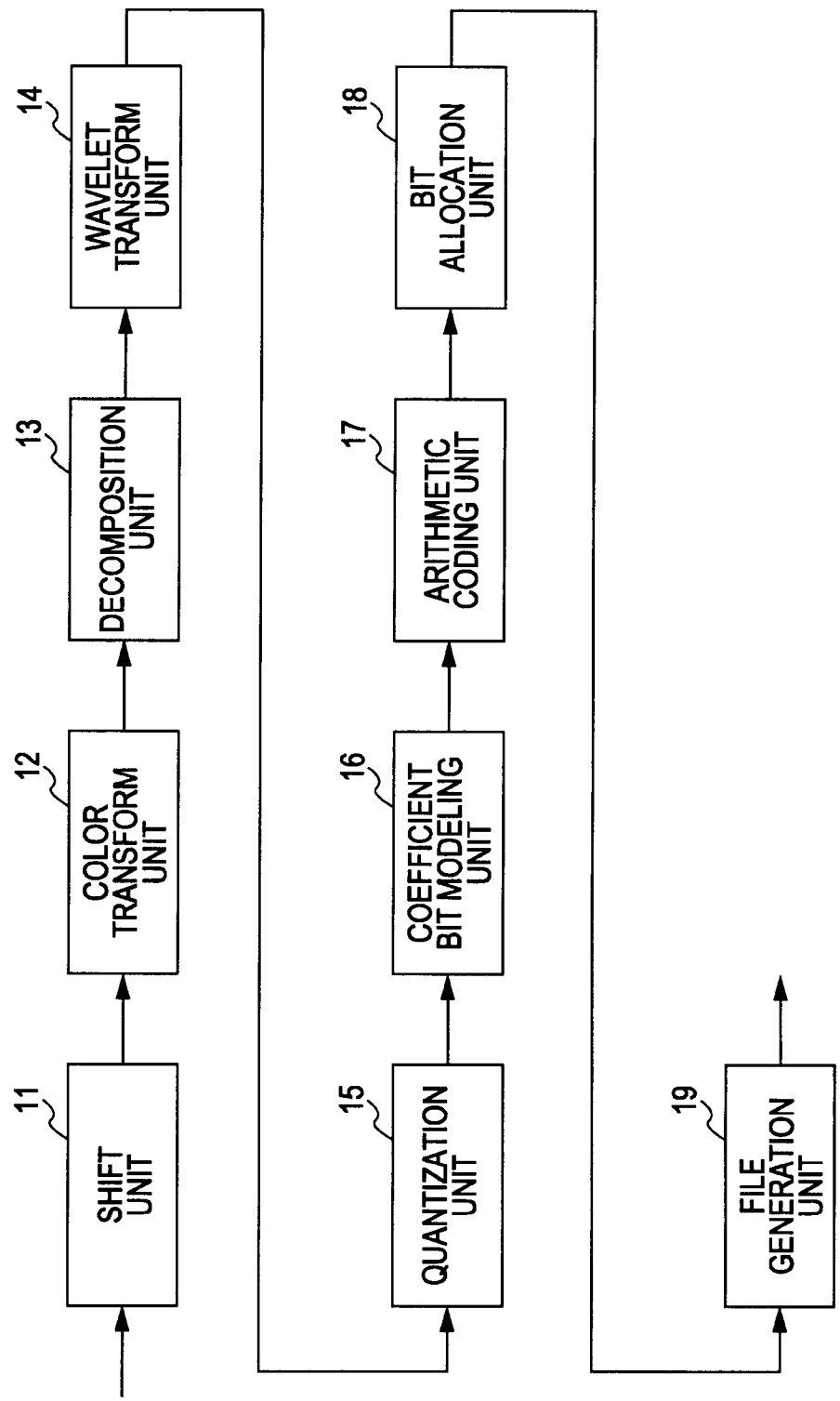
FIG. 1 is a block diagram of the structure of an encoder.

DESCRIPTION OF THE PREFERRED
EMBODIMENTS

Before describing an embodiment of the present invention, the correspondence between the features of the present invention and the specific elements disclosed in an embodiment of the present invention and the drawings is discussed below. This description is intended to assure that embodiments supporting the claimed invention are described in this specification and the drawings. Thus, even if an element in the following embodiments or the drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, a motion vector detecting apparatus includes a first generation unit (e.g., a lower level table generation unit 232 in FIG. 6), a second generation unit (e.g., a higher level table generation unit 231 in FIG. 6), a correction unit (e.g., a correction unit 242 in FIG. 6), a first extraction unit (e.g., an extraction unit 244 in FIG. 6), a second extraction unit (e.g., an extraction unit 243 in FIG. 6), and a detection unit (e.g., a motion vector detection module 214). The first generation unit generates a first evaluation value table from image signals of a first level. The second generation unit generates a second evaluation value table from image signals of a second level higher than the first level. The correction unit corrects the first evaluation value table using the second evaluation value table. The first extraction unit extracts first candidate vectors using the first evaluation value table. The second extraction unit extracts second candidate vectors using the corrected first evaluation value table. The detection unit detects a motion vector from the first and second candidate vectors.

The apparatus may further include a relating unit (e.g., an expansion unit 241 in FIG. 6) that relates the size of the second evaluation value table to that of the first evaluation value table. The correction unit may correct the first evaluation value table using the second evaluation value table with the related size.

Figure 7:
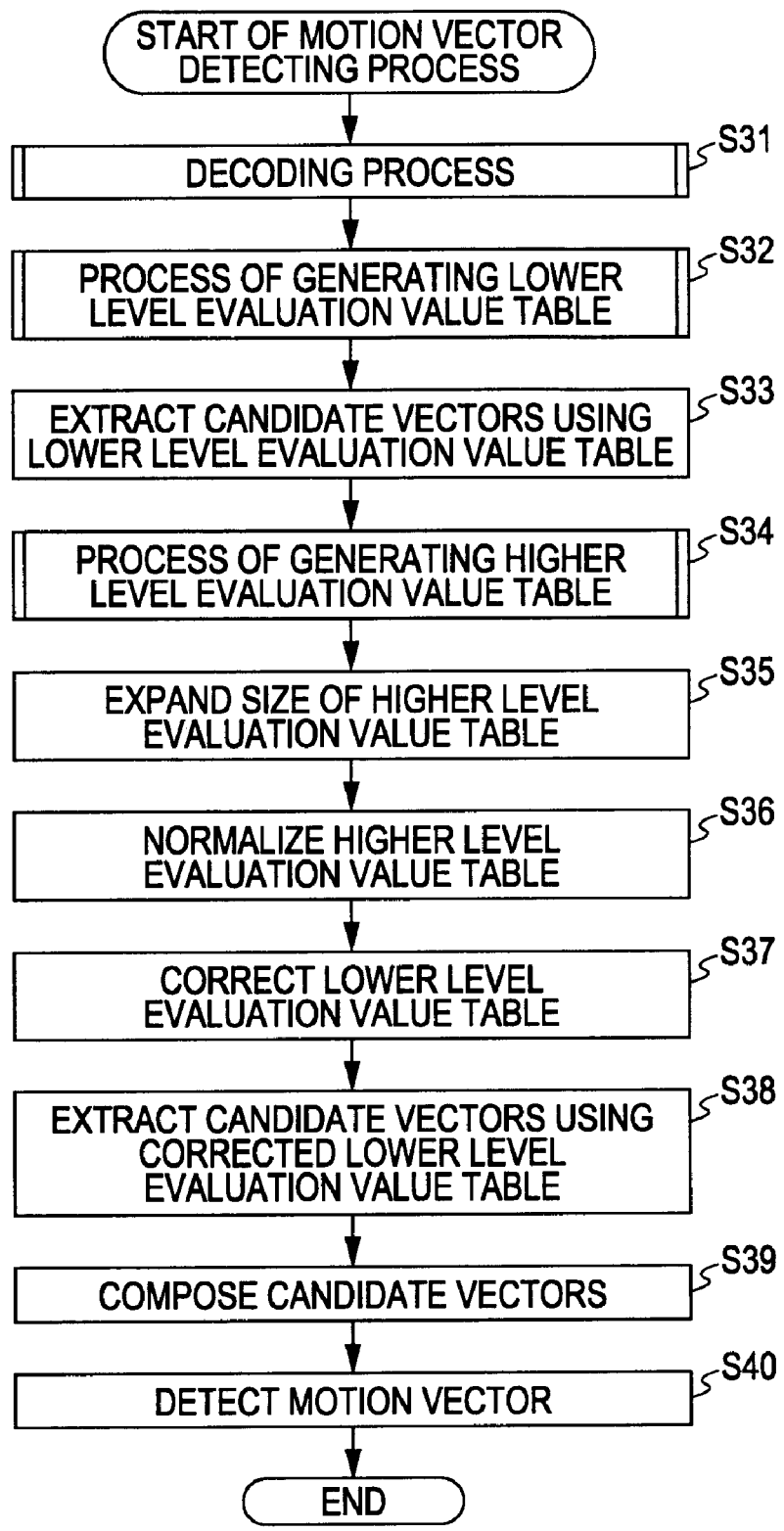
FIG. 7 is a flowchart explaining a motion vector detecting process.

The correction unit may normalize the second evaluation value table and correct the first evaluation value table using the normalized second evaluation value table (in, for example, steps S36 and S37 in FIG. 7).

Figure 24:
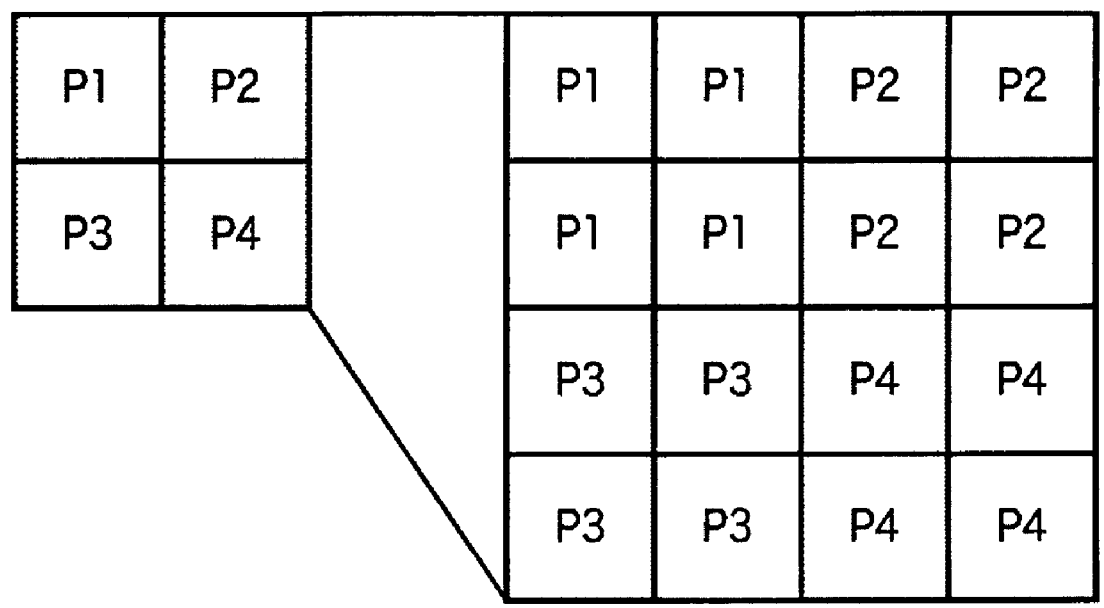
FIG. 24 is a diagram explaining expansion of an evaluation value table.

The relating unit may expand evaluation values of the second evaluation value table as evaluation values in neighbor pixel positions to perform relating (in, for example, a process explained with reference to FIG. 24).

The apparatus may further include an output unit (e.g., a decoder 211 in FIG. 6) that performs inverse wavelet transform on a wavelet-transformed image signal to output an image signal of the first level and that of the second level.

According to another embodiment of the present invention, a method for detecting a motion vector (for example, a method for detecting a motion vector in FIG. 7) includes the steps of generating a first evaluation value table from image signals of a first level (for example, step S32 in FIG. 7), generating a second evaluation value table from image signals of a second level higher than the first level (for example, step S34 in FIG. 7), correcting the first level evaluation value table on the basis of the second evaluation value table (for example, S37 in FIG. 7), extracting first candidate vectors using the first evaluation value table (for example, step S33 in FIG. 7), extracting second candidate vectors using the corrected first evaluation value table (for example, step S38 in FIG. 7), and detecting a motion vector from the first and second candidate vectors (for example, step S40 in FIG. 7).

According to further another embodiment of the present invention, a program allows a computer to implement the above-described steps.

An embodiment of the present invention will be described with reference to the drawings. A case where a motion vector is detected from image signals encoded in Joint Photographic Experts Group (JPEG) 2000 will now be described as an example.

FIG. 1 shows the structure of an encoder. An encoder 1 includes a shift unit 11, a color transform unit 12, a decomposition unit 13, a wavelet transform unit 14, a quantization unit 15, a coefficient bit modeling unit 16, an arithmetic coding unit 17, a bit allocation unit 18, and a file generation unit 19.

The shift unit 11 executes a process for shifting the direct current (DC) level of a signal in order to efficiently perform discrete wavelet transform in the wavelet transform unit 14 arranged downstream of the shift unit 11. Specifically, since an RGB signal is generally expressed by a positive integer, the process involves subtracting half a dynamic range. When an input signal is signed, the shifting process is not performed. For example, when one pixel is expressed by eight bits and has any value of 0 to 255, a value "128" is subtracted as expressed by the following expression. Thus, values of respective pixels are shifted to the range of −128 to 127.

$$R'=R-128$$
$$G'=G-128$$
$$B'=B-128 \quad (1)$$

The color transform unit 12 transforms a signal in an RGB color space into that in a YCbCr color space with a luma component Y and chroma components Cb and Cr using Expression (2) or (3).

$$\begin{bmatrix} Y \\ C_b \\ C_r \end{bmatrix} = \begin{bmatrix} 0.229 & 0.587 & 0.114 \\ -0.16875 & -0.33126 & 0.5 \\ 0.5 & -0.41869 & -0.08131 \end{bmatrix} \begin{bmatrix} R \\ G \\ B \end{bmatrix} \quad (2)$$

$$\begin{bmatrix} Y' \\ C'_b \\ C'_r \end{bmatrix} = \begin{bmatrix} \left[\dfrac{R+2G+B}{4}\right] \\ R-G \\ B-G \end{bmatrix} \quad (3)$$

The decomposition unit 13 splits an image into a plurality of tiles (blocks). The units located downstream of the decomposition unit 13 process each tile as an individual image.

The wavelet transform unit 14 performs one-dimensional two-band filter bank processing on an image signal, serving as a two-dimensional signal, to achieve two-dimensional discrete wavelet transform (DWT).

Referring to FIG. 2, the wavelet transform unit 14 includes circuit units each including a low-pass filter for extracting a low frequency component of an input image signal, a sampling circuit for downsampling the number of pixels of an image output from the low-pass filter to ½, a high-pass filter for extracting a high frequency component of the input image signal, and another sampling circuit for downsampling the number of pixels of an image output from the high-pass filter to ½. Those circuit units corresponding to the necessary number are cascaded.

In the present embodiment shown in FIG. 2, a low-pass filter (LPFV) 51, a downsampling circuit 52, a high-pass filter (HPFV) 53, and a downsampling circuit 54 constituting a circuit unit for processing in the vertical direction (hereinafter, a vertical processing circuit unit) are arranged at a first stage. A low-pass filter (LPFh) 61, a downsampling circuit 62, a high-pass filter (HPFh) 63, and a downsampling circuit 64 constituting a circuit unit for processing in the horizontal direction (hereinafter, a horizontal processing circuit unit) are arranged downstream of the downsampling circuit 52. A low-pass filter (LPFh) 71, a downsampling circuit 72, a high-pass filter (HPFh) 73, and a downsampling circuit 74 constituting a horizontal processing circuit unit are arranged downstream of the downsampling circuit 54.

A low-pass filter (LPFv) 81, a downsampling circuit 82, a high-pass filter (HPFV) 83, and a downsampling circuit 84 constituting a vertical processing circuit unit are arranged downstream of the downsampling circuit 62. A low-pass filter (LPFh) 91, a downsampling circuit 92, a high-pass filter (HPFh) 93, and a downsampling circuit 94 constituting a horizontal processing circuit unit are arranged downstream of the downsampling circuit 82. A low-pass filter (LPFh) 101, a downsampling circuit 102, a high-pass filter (HPFh) 103, and a downsampling circuit 104 constituting a horizontal processing circuit unit are arranged downstream of the downsampling circuit 84.

Figure 3:
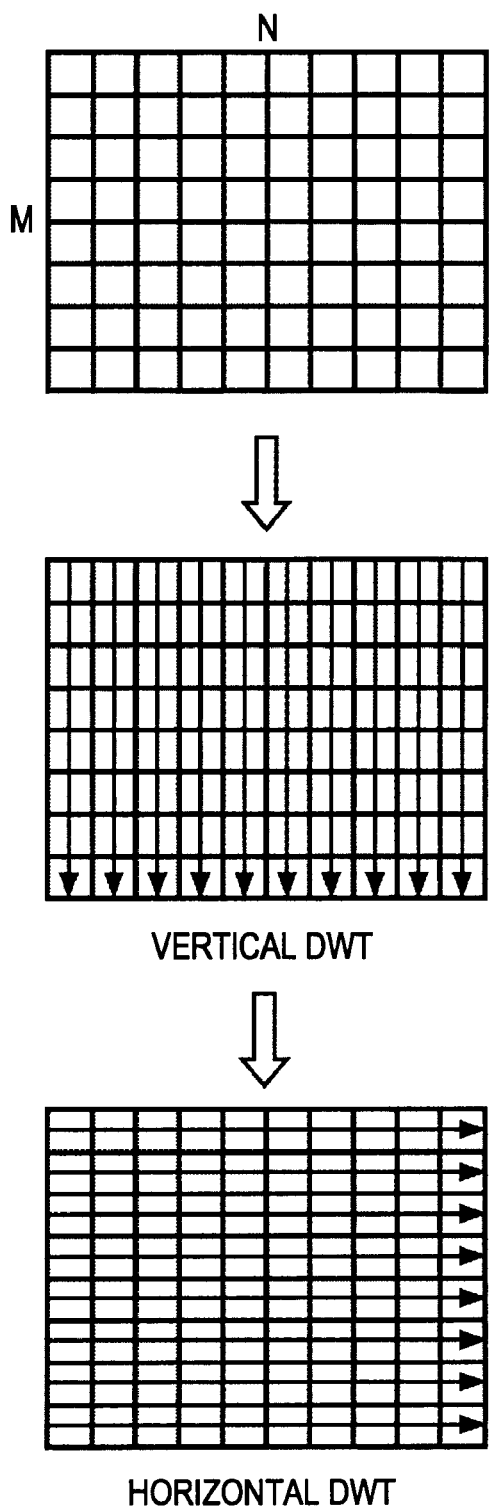
FIG. 3 includes diagrams explaining two-dimensional discrete wavelet transform.

Each vertical processing circuit unit performs vertical DWT on a tile, composed of M×N pixels, shown in upper part of FIG. 3 to obtain the resultant tile shown in middle part of FIG. 3. Further, each horizontal processing circuit unit performs horizontal DWT on the tile to obtain the resultant tile shown in lower part of FIG. 3. Thus, the two-dimensional DWT is achieved. Alternatively, vertical DWT may follow horizontal DWT.

The quantization unit 15 performs scalar quantization on wavelet coefficients.

The coefficient bit modeling unit 16 and the arithmetic coding unit 17 perform encoding based on the EBCOT (Embedded Block Coding with Optimized Truncation) algorithm. The coefficient bit modeling unit 16 splits input subband coefficients into code-blocks, rectangular regions, and decomposes each code-block into bit-planes. For example, when each code-block has a size of 4×4 pixels, quantized coefficients corresponding to 16 pixels are expressed. Assuming that the maximum absolute value is 13 (expressed by four bits), the code-block is decomposed into four bit-planes corresponding to the number of bits of the maximum absolute value. Each bit-plane is divided into three coding passes.

The arithmetic coding unit 17 divides a range of 0 to 1 into sub-ranges proportional to the probability of a symbol. Each sub-range is further divided into sub-sub-ranges proportional to the probability of the symbol. Such an operation is repeated, so that a bit string of a lower bound value in the finally obtained range corresponds to a compressed code.

The bit allocation unit 18 performs a process of discarding data exceeding a given bit rate. The file generation unit 19 packetizes data to generate a file suitable for transmission.

Figure 4:
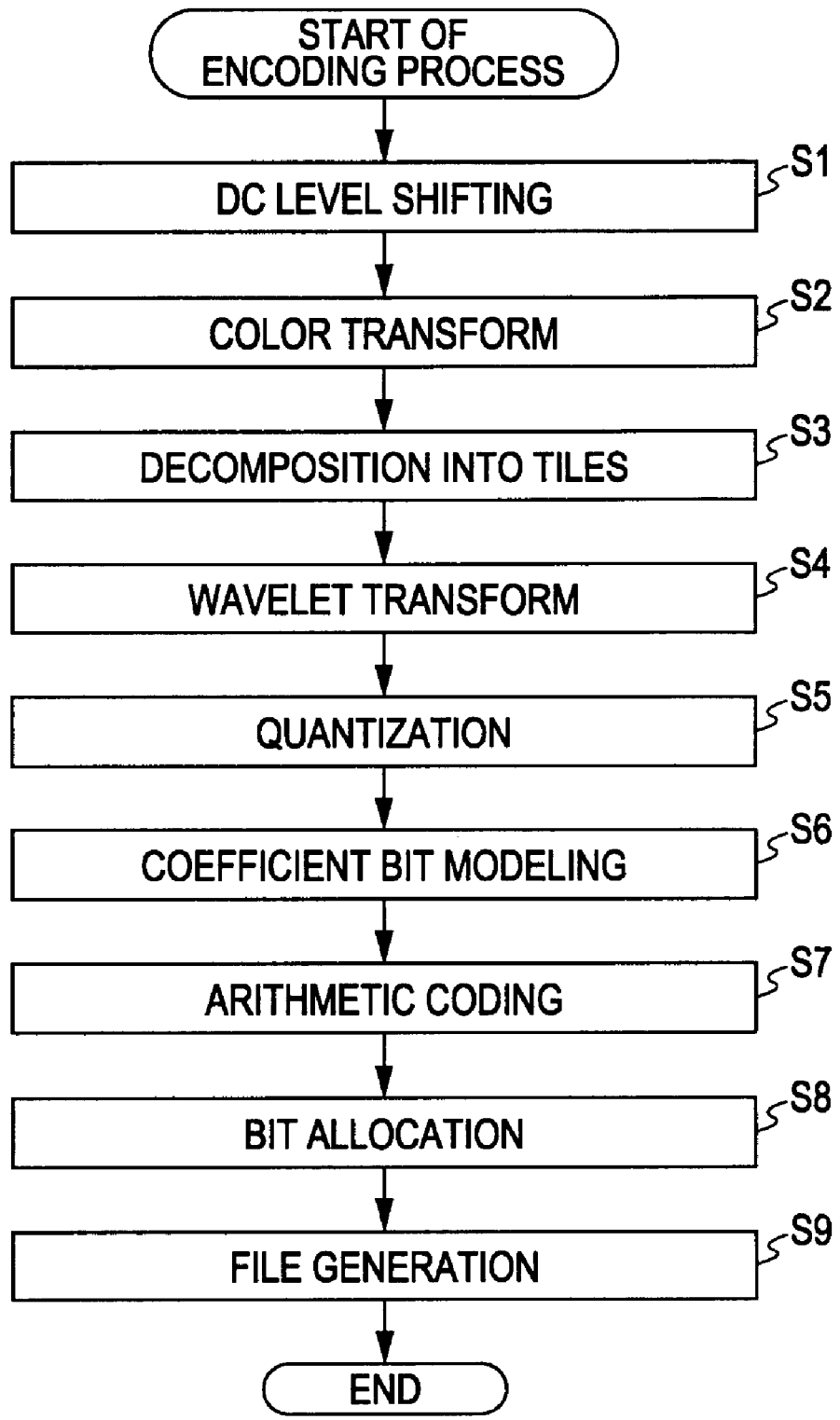
FIG. 4 is a flowchart explaining an encoding process.

An encoding process by the encoder 1 will now be described with reference to a flowchart of FIG. 4.

In step S1, the shift unit 11 shifts the DC level of an input RGB image signal. Specifically, for example, a value "128" is subtracted from each pixel value, as described above. In step S2, the color transform unit 12 performs color transform. Specifically, an arithmetic operation based on Expression (2) or (3) is performed, thus transforming the RGB signal into a YCbCr signal.

In step S3, the decomposition unit 13 divides a signal output from the color transform unit 12 into tiles. Decomposition into tiles may be performed prior to level shifting.

Figure 5A:
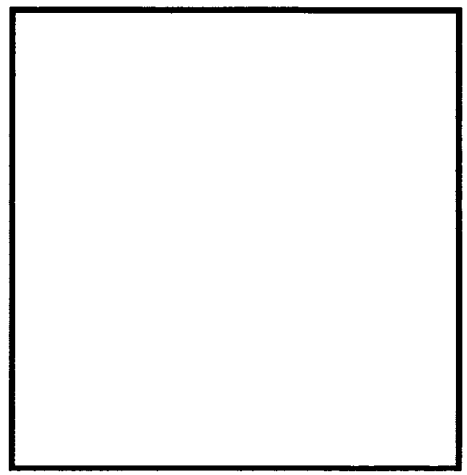
FIGS. 5A to 5C are diagrams explaining subbands in wavelet transform.
Figure 5B:
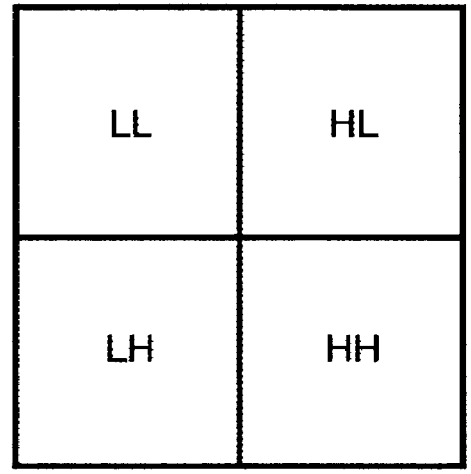

In step S4, the wavelet transform unit 14 performs wavelet transform on each tile of the image signal. Consequently, an original image shown in FIG. 5A is subjected to vertical DWT by the low-pass filter 51, the downsampling circuit 52, the high-pass filter 53, and the downsampling circuit 54. Further, an output of the downsampling circuit 52 is subjected to horizontal DWT by the low-pass filter 61, the downsampling circuit 62, the high-pass filter 63, and the downsampling circuit 64. In addition, an output of the downsampling circuit 54 is subjected to horizontal DWT by the low-pass filter 71, the downsampling circuit 72, the high-pass filter 73, and the downsampling circuit 74. Thus, subband components of LL/4, LH/4, HL/4, and HH/4 are generated as shown in FIG. 5B.

Figure 5C:
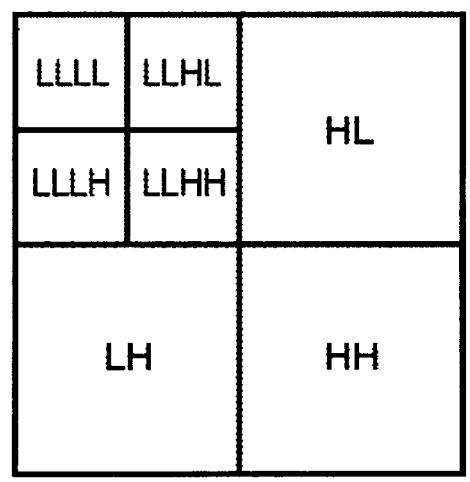

An output (the subband component of LL/4) of the downsampling circuit 62 is subjected to vertical DWT by the low-pass filter 81, the downsampling circuit 82, the high-pass filter 83, and the downsampling circuit 84. Further, an output of the downsampling circuit 82 is subjected to horizontal DWT by the low-pass filter 91, the downsampling circuit 92, the high-pass filter 93, and the downsampling circuit 94. Simultaneously, an output of the downsampling circuit 84 is subjected to horizontal DWT by the low-pass filter 101, the downsampling circuit 102, the high-pass filter 103, and the downsampling circuit 104. Thus, subband components of LLLL/16, LLLH/16, LLHL/16, and LLHH/16 are generated as shown in FIG. 5C.

In step S5, the quantization unit 15 scalar-quantizes wavelet coefficients output from the wavelet transform unit 14. In step S6, the coefficient bit modeling unit 16 performs coefficient bit modeling. In other words, the input subband coefficients are split into code-blocks. Each code-block is decomposed into bit-planes. Each bit-plane is divided into coding passes.

In step S7, the arithmetic coding unit 17 performs arithmetic coding. In step S8, the bit allocation unit 18 performs bit allocation. In step S9, the file generation unit 19 generates a file.

Figure 6:
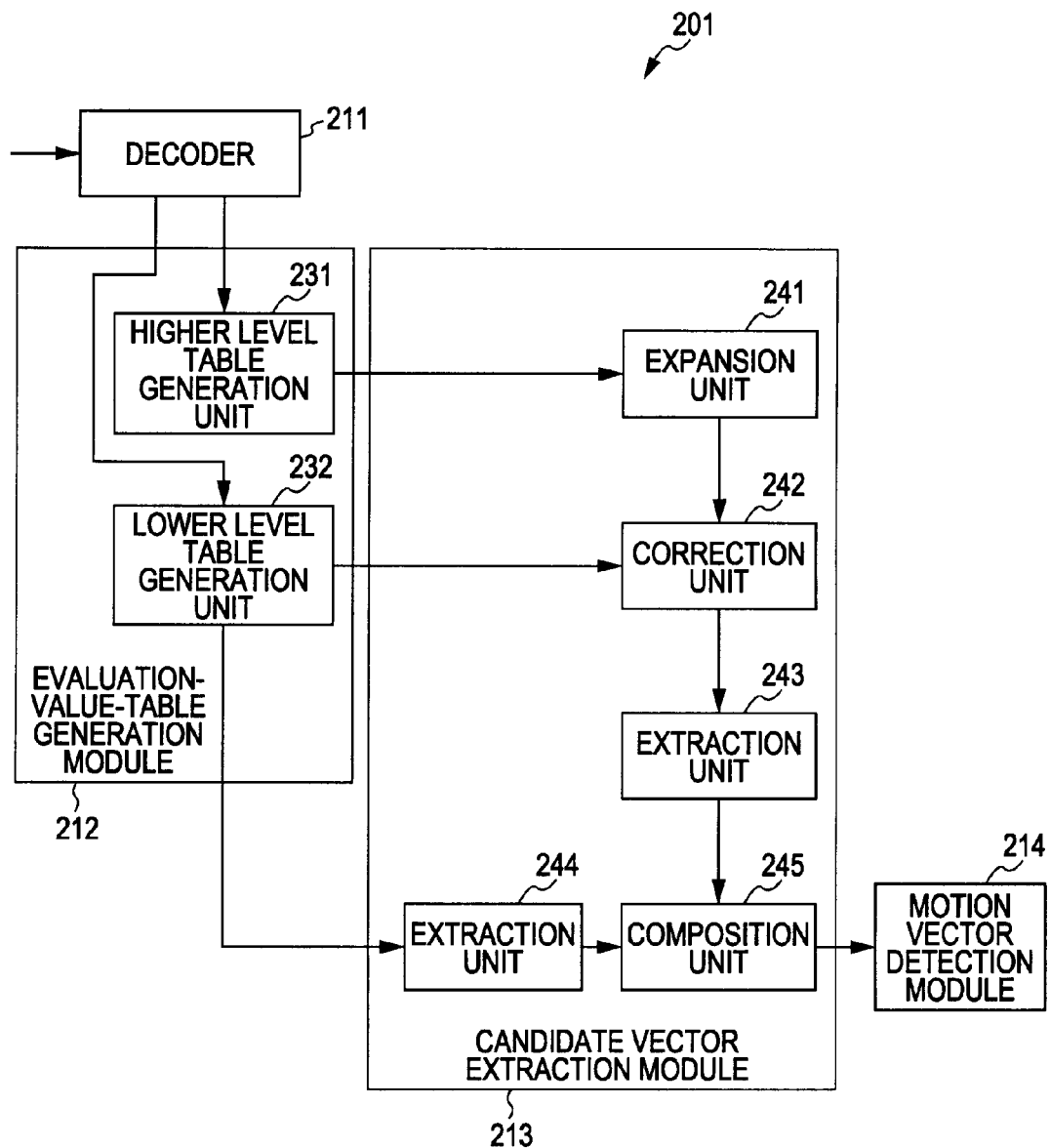
FIG. 6 is a block diagram of the structure of a motion vector detecting apparatus according to an embodiment of the present invention.

In the present embodiment of the present invention, image signals encoded using JPEG 2000 as described above are decoded and a motion vector is detected from the decoded image signals. FIG. 6 shows a motion vector detecting apparatus according to the present embodiment of the present invention.

A motion vector detecting apparatus 201 includes a decoder 211, an evaluation-value-table generation module 212, a candidate vector extraction module 213, and a motion vector detection module 214.

The decoder 211 decodes an image signal encoded using JPEG 2000. The decoder 211 outputs not only a lower level image signal, serving as a finally decoded image signal, but also a higher level image signal which is generated during decoding. The detailed structure of the decoder 211 will be described later with reference to FIG. 8.

The evaluation-value-table generation module 212 includes a higher level table generation unit 231 and a lower level table generation unit 232. The lower level table generation unit 232 generates a lower level evaluation value table from a lower level image signal supplied from the decoder 211. The higher level table generation unit 231 generates a higher level evaluation value table from a higher level image signal supplied from the decoder 211.

The candidate vector extraction module 213 includes an expansion unit 241, a correction unit 242, extraction units 243 and 244, and a composition unit 245.

The expansion unit 241 expands the size of the higher level evaluation value table supplied from the higher level table generation unit 231 such that the size thereof matches that of the lower level evaluation value table generated by the lower level table generation unit 232. The correction unit 242 corrects the lower level evaluation value table generated by the lower level table generation unit 232 on the basis of the higher level evaluation value table expanded by the expansion unit 241.

The extraction unit 243 extracts candidate vectors, serving as candidates for a motion vector, from the lower level evaluation value table corrected by the correction unit 242. The extraction unit 244 extracts candidate vectors from the lower level evaluation value table generated by the lower level table generation unit 232. The composition unit 245 composes the candidate vectors extracted by the extraction unit 243 with those extracted by the extraction unit 244. The motion vector detection module 214 detects a motion vector from the composed candidate vectors obtained by the composition unit 245.

A motion vector detecting process by the motion vector detecting apparatus 201 will now be described with reference to a flowchart of FIG. 7.

Figure 8:
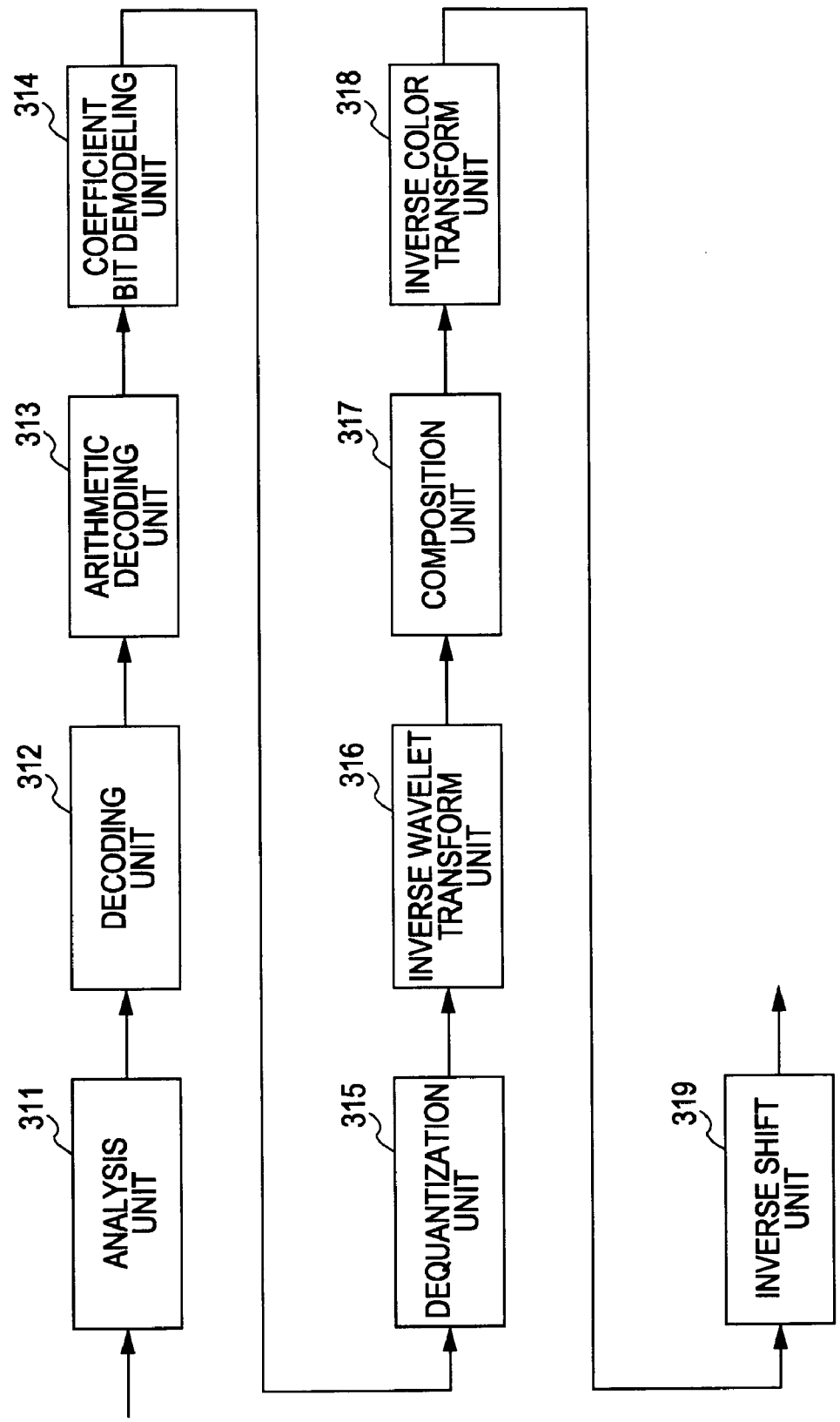
FIG. 8 is a block diagram of the structure of a decoder.

In step S31, the decoder 211 performs a decoding process on an image signal encoded using JPEG 2000. FIG. 8 shows the structure of the decoder 211.

The decoder 211 includes an analysis unit 311, a decoding unit 312, an arithmetic decoding unit 313, a coefficient bit demodeling unit 314, a dequantization unit 315, an inverse wavelet transform unit 316, a composition unit 317, an inverse color transform unit 318, and an inverse shift unit 319.

The analysis unit 311 performs a process that is inverse to the file generation by the file generation unit 19 in FIG. 1. In other words, the analysis unit 311 depacketizes a supplied image signal and outputs the resultant signal to the decoding unit 312. The decoding unit 312 performs a process inverse to that by the bit allocation unit 18 in FIG. 1 and outputs a detected code. The arithmetic decoding unit 313 performs arithmetic decoding inverse to arithmetic coding by the arithmetic coding unit 17. The coefficient bit demodeling unit 314 performs demodeling inverse to modeling by the coefficient bit modeling unit 16 in FIG. 1.

The dequantization unit 315 performs dequantization inverse to quantization by the quantization unit 15 in FIG. 1. The inverse wavelet transform unit 316 performs inverse wavelet transform on a signal wavelet-transformed by the wavelet transform unit 14 in FIG. 1. The composition unit 317 composes tiles obtained by the decomposition unit 13 in FIG. 1. The inverse color transform unit 318 transforms a YCbCr signal, obtained by the color transform unit 12 in FIG. 1, into an original RGB signal using Expression (4) or Expression (5).

$$\begin{bmatrix} R \\ G \\ B \end{bmatrix} = \begin{bmatrix} 1.0 & 0 & 1.402 \\ 1.0 & -0.34413 & -0.71414 \\ 0.5 & 1.772 & 0 \end{bmatrix} \begin{bmatrix} Y \\ C_b \\ C_r \end{bmatrix} \quad (4)$$

$$\begin{bmatrix} R \\ G \\ B \end{bmatrix} = \begin{bmatrix} Y' - \left[ \frac{C'_b - C'_r}{4} \right] \\ C'_b + G \\ C'_r + G \end{bmatrix} \quad (5)$$

The inverse shift unit 319 performs a process of returning the shift process by the shift module 11 in FIG. 1. In other words, a value "128" is added to each pixel value.

Figure 9:
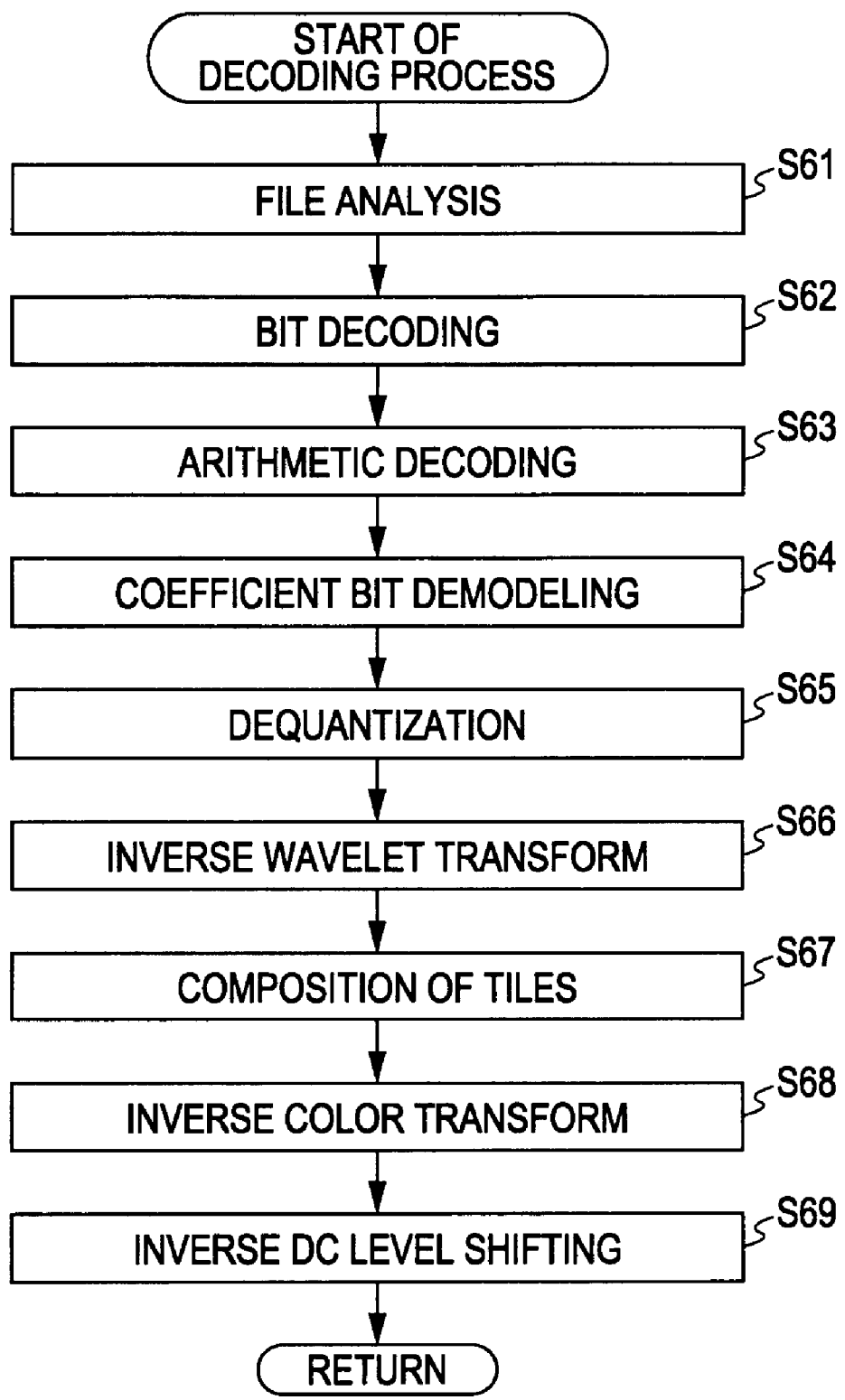
FIG. 9 is a flowchart explaining a decoding process.

FIG. 9 shows a flowchart of the decoding process by the decoder 211. Referring to FIG. 9, the analysis unit 311 analyzes a file in step S61. Thus, the depacketizing process is performed to extract a code. In step S62, the decoding unit 312 decodes bits.

In steps S63 and S64, inverse EBCOT is performed. In other words, in step S63, the arithmetic decoding unit 313 performs arithmetic decoding on an output of the decoding unit 312. In step S64, the coefficient bit demodeling unit 314 performs coefficient bit demodeling on an output of the arithmetic decoding unit 313. In step S65, the dequantization unit 315 dequantizes an output of the coefficient bit demodeling unit 314.

Figure 10:
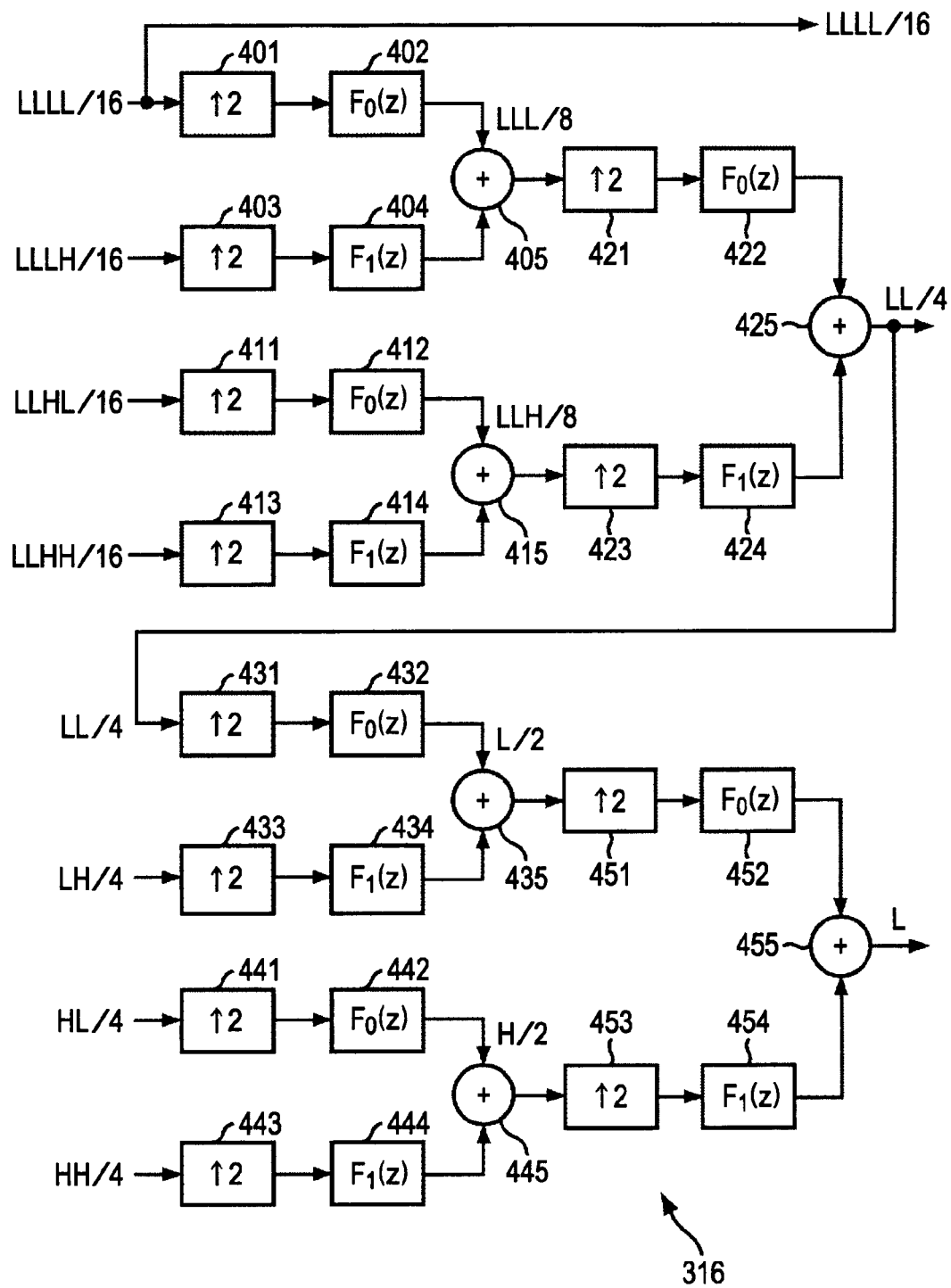
FIG. 10 is a block diagram of the structure of an inverse wavelet transform unit.

In step S66, the inverse wavelet transform unit 316 performs inverse wavelet transform on an output of the dequantization unit 315. The inverse wavelet transform unit 316 includes components shown in FIG. 10. Referring to FIG. 10, the inverse wavelet transform unit 316 includes circuit units each including an upsampling circuit for upsampling an input image signal, i.e., doubling the number of pixels of the image signal, a low-pass filter for extracting a low frequency component of an output of the upsampling circuit, another upsampling circuit, a high-pass filter for extracting a high frequency component of an output of the other upsampling circuit, and an adder for adding an output of the low-pass filter and that of the high-pass filter.

In the present embodiment shown in FIG. 10, an upsampling circuit 401 horizontally upsamples a subband of LLLL/16. A low-pass filter 402 extracts a low frequency component of an output of the upsampling circuit 401. An upsampling circuit 403 horizontally upsamples a subband of LLLH/16. A high-pass filter 404 extracts a high frequency component of an output of the upsampling circuit 403. An adder 405 adds an output of the low-pass filter 402 and that of the high-pass filter 404 and then outputs a subband of LLL/8.

An upsampling circuit 411 horizontally upsamples a subband of LLHL/16. A low-pass filter 412 extracts a low frequency component of an output of the upsampling circuit 411. An upsampling circuit 413 horizontally upsamples a subband of LLHH/16. A high-pass filter 414 extracts a high frequency component of an output of the upsampling circuit 413. An adder 415 adds an output of the low-pass filter 412 and that of the high-pass filter 414 and then outputs a subband of LLH/8.

An upsampling circuit 421 vertically upsamples the subband of LLL/8, which is output from the adder 405. A low-pass filter 422 extracts a low frequency component of an output of the upsampling circuit 421. An upsampling circuit 423 vertically upsamples the subband of LLH/8, which is output from the adder 415. A high-pass filter 424 extracts a high frequency component of an output of the upsampling circuit 423. An adder 425 adds an output of the low-pass filter 422 and that of the high-pass filter 424 and then outputs a subband of LL/4.

An upsampling circuit 431 horizontally upsamples the subband of LL/4, which is output from the adder 425. A low-pass filter 432 extracts a low frequency component of an output of the upsampling circuit 431. An upsampling circuit 433 horizontally upsamples a subband of LH/4. A high-pass filter 434 extracts a high frequency component of an output of the upsampling circuit 433. An adder 435 adds an output of the low-pass filter 432 and that of the high-pass filter 434 and then outputs a subband of L/2.

An upsampling circuit 441 horizontally upsamples a subband of HL/4 and a low-pass filter 442 extracts a low frequency component of an output of the upsampling circuit 441. An upsampling circuit 443 horizontally upsamples a subband of HH/4. A high-pass filter 444 extracts a high frequency component of an output of the upsampling circuit 443. An adder 445 adds an output of the low-pass filter 442 and that of the high-pass filter 444 and then outputs a subband of H/2.

An upsampling circuit 451 vertically upsamples the subband of L/2, which is output from the adder 435. A low-pass filter 452 extracts a low frequency component of an output of the upsampling circuit 451. An upsampling circuit 453 vertically upsamples the subband of H/2, which is output from the adder 445. A high-pass filter 454 extracts a high frequency component of an output of the upsampling circuit 453. An adder 455 adds an output of the low-pass filter 452 and that of the high-pass filter 454 and then outputs an original image signal L.

In the present embodiment, the signal L is output from the adder 455 to the lower level table generation unit 232. In addition, the subband of LL/4 is output from the adder 425 to the higher level table generation unit 231. Further, the subband of LLLL/16 may be output as it is to the evaluation-value-table generation module 212, as necessary. In the wavelet transform unit 14 shown in FIG. 2, when vertical processing (DWT) follows horizontal processing (DWT), horizontal processing follows vertical processing in the inverse wavelet transform unit 316.

After completion of inverse wavelet transform by the inverse wavelet transform unit 316, in step S67, the composition unit 317 composes tiles. In step S68, the inverse color transform unit 318 performs inverse color transform on an output of the composition unit 317, i.e., transforms a YCbCr signal into an RGB signal. In step S69, the inverse shift unit 319 inversely shifts the DC level of the signal to express each pixel value using a positive value.

Again referring to FIG. 7, when receiving the lower level image signal L generated by the decoding process by the decoder 211, the lower level table generation unit 232 performs a process of generating a lower level evaluation value table in step S32. The lower level table generation unit 232, therefore, has a structure shown in FIG. 11.

Figure 11:
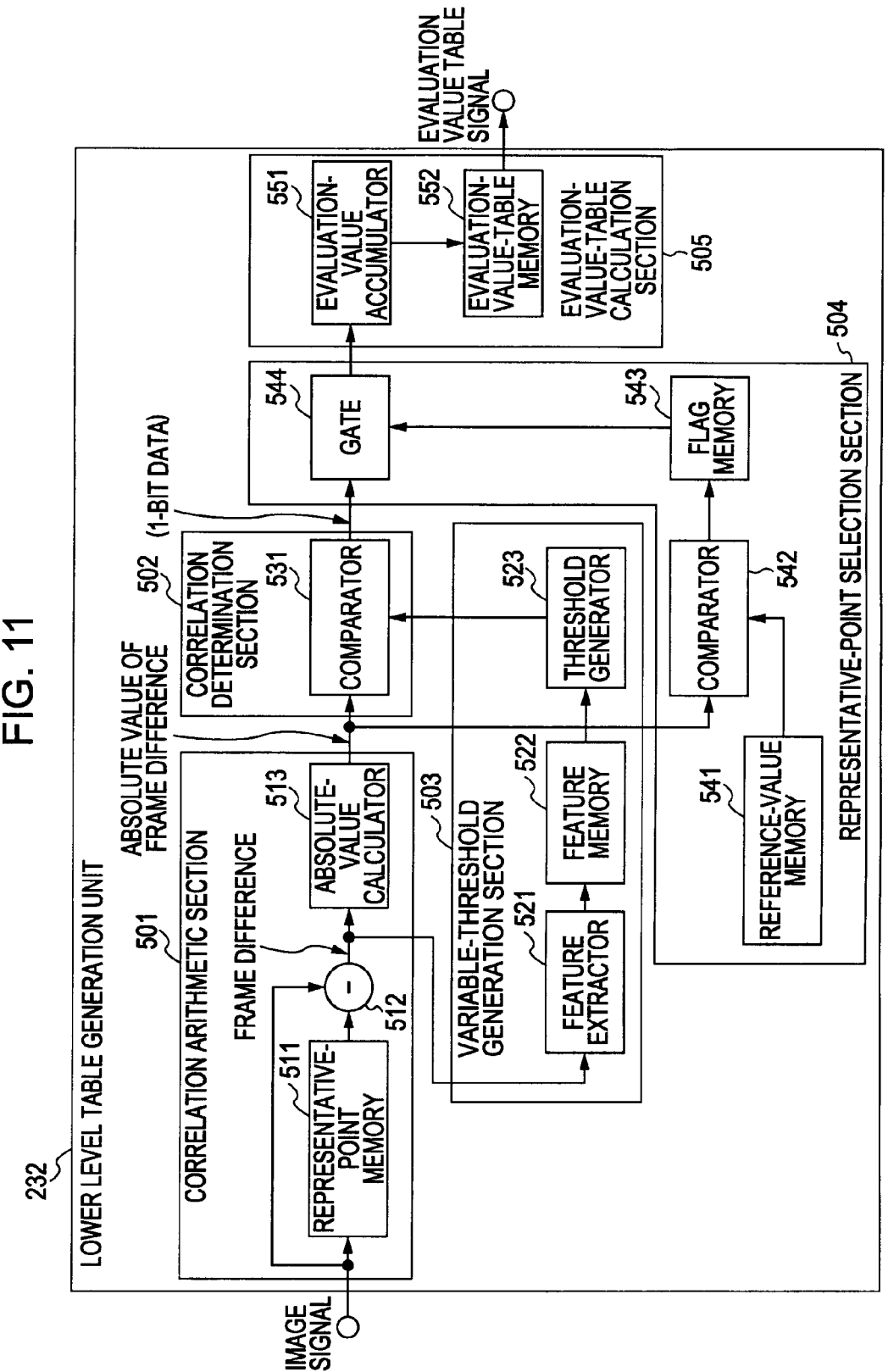
FIG. 11 is a block diagram of the structure of a lower level table generation unit.

Referring to FIG. 11, the lower level table generation unit 232 in accordance with the present embodiment includes a correlation arithmetic section 501, a correlation determination section 502, a variable-threshold generation section 503, a representative-point selection section 504, and an evaluation-value-table calculation section 505.

The correlation arithmetic section 501 includes a representative-point memory 511, a subtractor 512, and an absolute-value calculator 513. The representative-point memory 511 stores data (hereinafter, representative point data) regarding representative points related to input image data. The subtractor 512 performs arithmetic operation to obtain the difference between the representative point data stored in the representative-point memory 511 and image data as the difference between frames (hereinafter, frame difference). The absolute-value calculator 513 calculates the absolute value of the frame difference output from the subtractor 512.

The variable-threshold generation section 503 includes a feature extractor 521, a feature memory 522, and a threshold generator 523. The feature extractor 521 performs arithmetic operation on the input frame differences to obtain a feature in the neighborhood of the representative point and allows the feature memory 522 to store the obtained feature. The threshold generator 523 generates a variable threshold from the feature stored in the feature memory 522.

The correlation determination section 502 includes a comparator 531 for comparing data concerning the absolute value of each frame difference (hereinafter, frame-difference absolute-value data) output from the correlation arithmetic section 501 with threshold data output from the variable-threshold generation section 503. The comparator 531 calculates an evaluation value, serving as 1-bit data, as an evaluation value between each representative point and each pixel and outputs the evaluation value to the evaluation-value-table calculation section 505 through a gate 544 of the representative-point selection section 504.

The representative-point selection section 504 includes a reference-value memory 541, a comparator 542, a flag memory 543, and the gate 544. The reference-value memory 541 previously stores a reference value used for determining whether a representative point is located in a still region. The comparator 542 compares the absolute value of each frame difference output from the absolute-value calculator 513 with the reference value stored in the comparator 531 to determine whether the representative point is located in the still region. The flag memory 543 stores the result of determination by the comparator 542 as a flag. The gate 544 controls supply of a 1-bit evaluation value supplied from the comparator 531 to the subsequent stage on the basis of the flag stored in the flag memory 543.

The evaluation-value-table calculation section 505 includes an evaluation-value accumulator 551 and an evaluation-value-table memory 552. The evaluation-value accumulator 551 accumulates a 1-bit evaluation value supplied from the comparator 531 through the gate 544 to generate an evaluation value table and stores the table in the evaluation-value-table memory 552.

Figure 12:
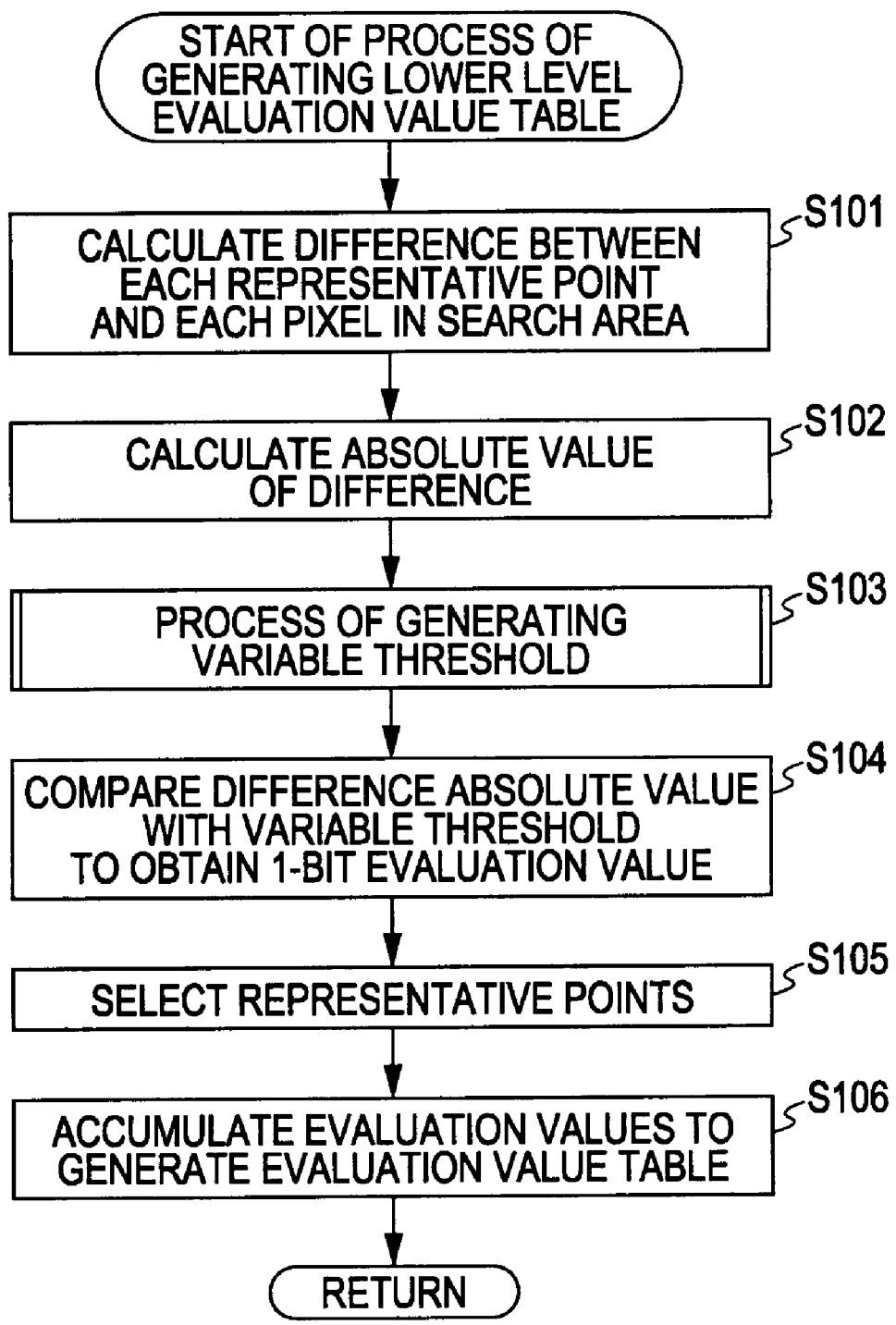
FIG. 12 is a flowchart explaining a process of generating a lower level evaluation value table.

The process of generating the lower level evaluation value table in step S32 of FIG. 7 will now be described in detail with reference to a flowchart of FIG. 12.

In step S101, the subtractor 512 calculates the difference between an image signal and each representative point. In other words, the lower level image signals L output from the decoder 211 are supplied to the correlation arithmetic section 501 in units of, for example, frames. In the correlation arithmetic section 501, the input image signal is supplied to the subtractor 512 and the representative-point memory 511.

Figure 13A:
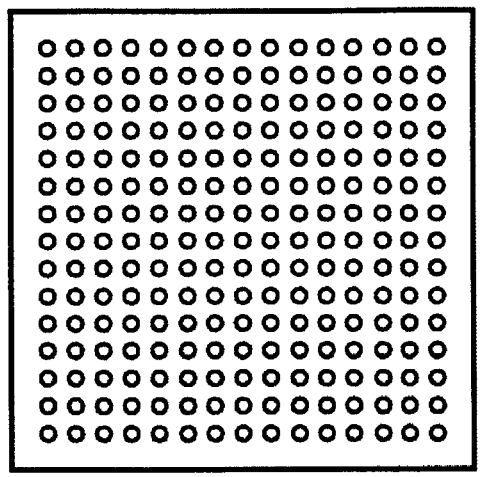
FIGS. 13A to 13C are diagrams explaining representative points in subbands.
Figure 13B:
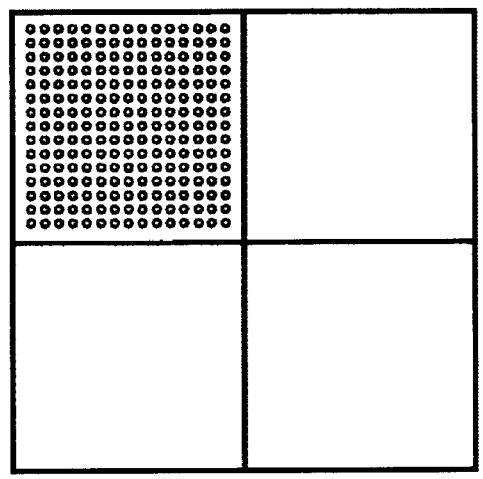
Figure 13C:
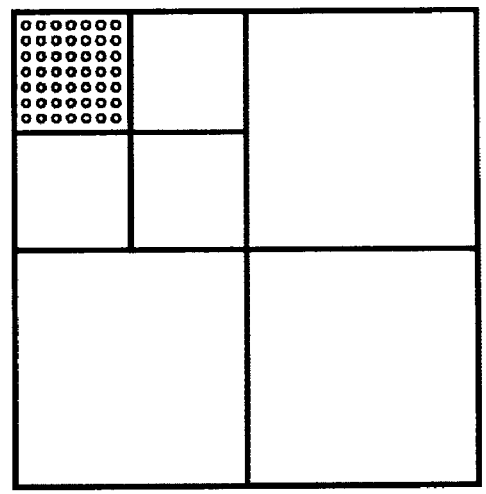
Figure 14:
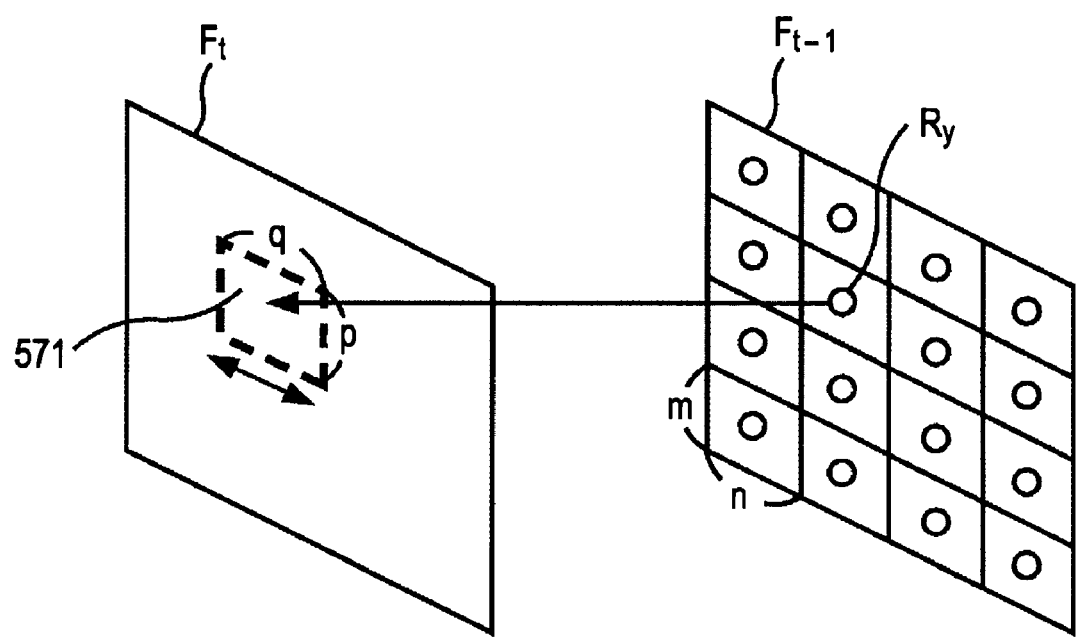
FIG. 14 is a diagram explaining a search area.

Referring to FIG. 13A, the representative-point memory 511 stores data concerning predetermined representative points in the input image signal serving as a frame. In FIGS. 13A to 13C, each blank circle represents a representative point. Referring to FIG. 14, one frame is divided into blocks each including, for example, m×n pixels and one representative point is set every block.

Specifically, each representative point is related to data regarding any of the following pixel values each representing the corresponding block:

a. the pixel value of a pixel located in the center of the block;

b. a mean value of the pixel values of all pixels in the block; and c. an intermediate value of the pixel values of all pixels in the block.

For example, the pixel values of pixels obtained by spatially and uniformly thinning out an input frame image are selected as pixel value data. The pixel value data is stored as data (hereinafter, representative point data) regarding representative points in the representative-point memory 511.

Representative point data $R_y$ related to the previous frame $F_{t-1}$ read from the representative-point memory 511 and image data related to the current frame $F_t$ are supplied to the subtractor 512.

Referring to FIG. 14, the subtractor 512 calculates the frame difference in pixel value between the representative point $R_y$ of the previous frame $F_{t-1}$ and each pixel in a search area 571, corresponding to the representative point $R_y$, in image data of the current frame $F_t$, e.g., the frame difference (result of correlation arithmetic operation) and outputs the calculated frame difference to the absolute-value calculator 513. The search area 571 includes p×q pixels.

In step S102, the absolute-value calculator 513 calculates the absolute value of the frame difference (result of correlation arithmetic operation) input from the subtractor 512, the frame difference being based on the representative point data $R_y$ of the previous frame $F_{t-1}$ and the image data of the current frame $F_t$.

Figure 15:
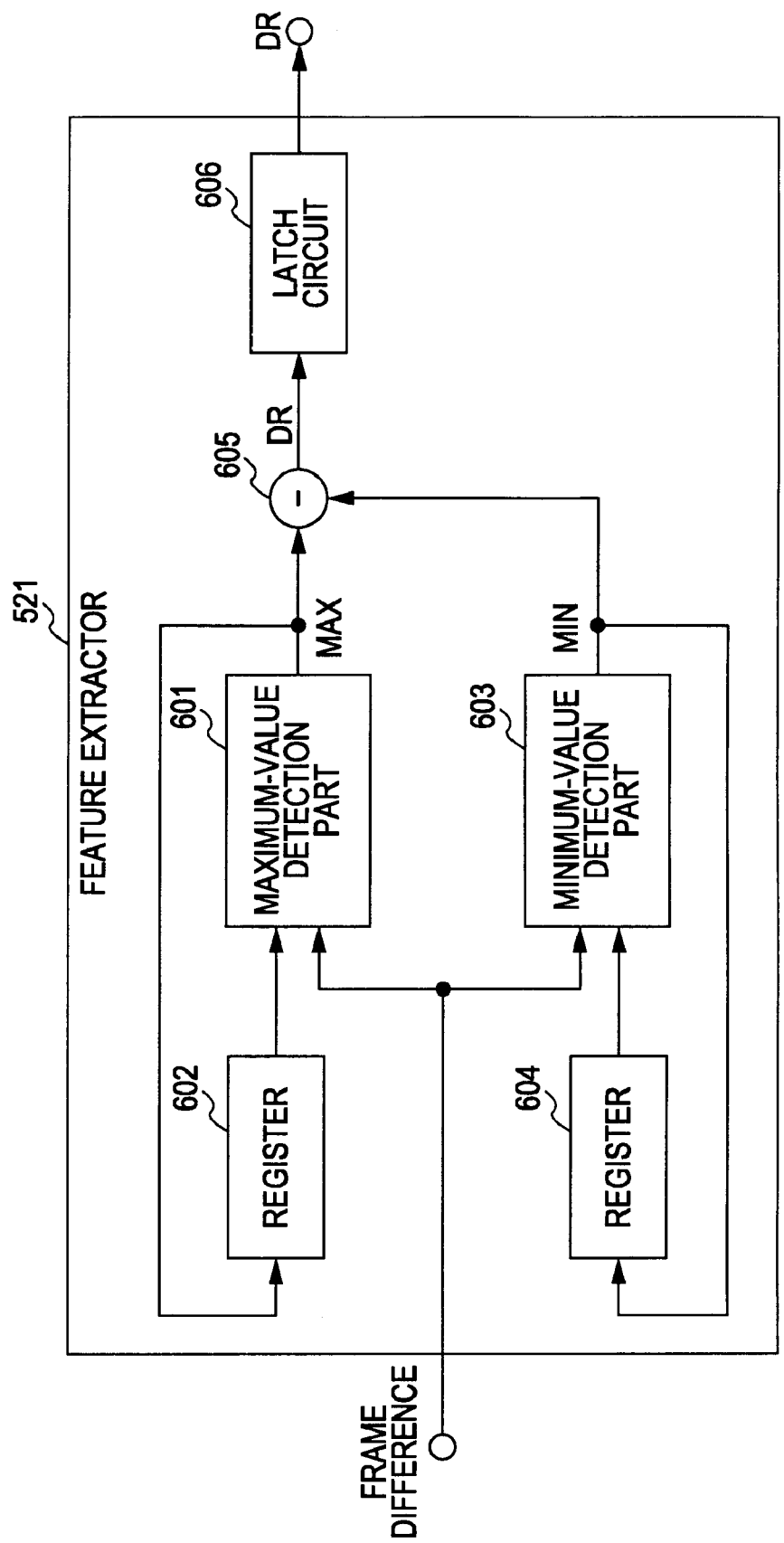
FIG. 15 is a block diagram of the structure of a feature extractor.

In step S103, the variable-threshold generation section 503 executes a process of generating a variable threshold. Referring to FIG. 15, the feature extractor 521 of the variable-threshold generation section 503 includes a maximum-value detection part 601, registers 602 and 604, a minimum-value detection part 603, a subtractor 605, and a latch circuit 606.

The maximum-value detection part 601 compares the frame difference supplied from the subtractor 512 and a maximum value which has been detected and is held in the register 602 and outputs the larger one of them to the register 602. The minimum-value detection part 603 compares the frame difference supplied from the subtractor 512 with a minimum value which has been detected and is held in the register 604 and outputs the smaller one of them to the register 604. The subtractor 605 obtains a dynamic range DR, serving as the difference between the maximum value output from the maximum-value detection part 601 and the minimum value output from the minimum-value detection part 603, and allows the latch circuit 606 to latch the dynamic range DR. The dynamic range latched by the latch circuit 606 is stored as a feature in the feature memory 522.

Figure 16:
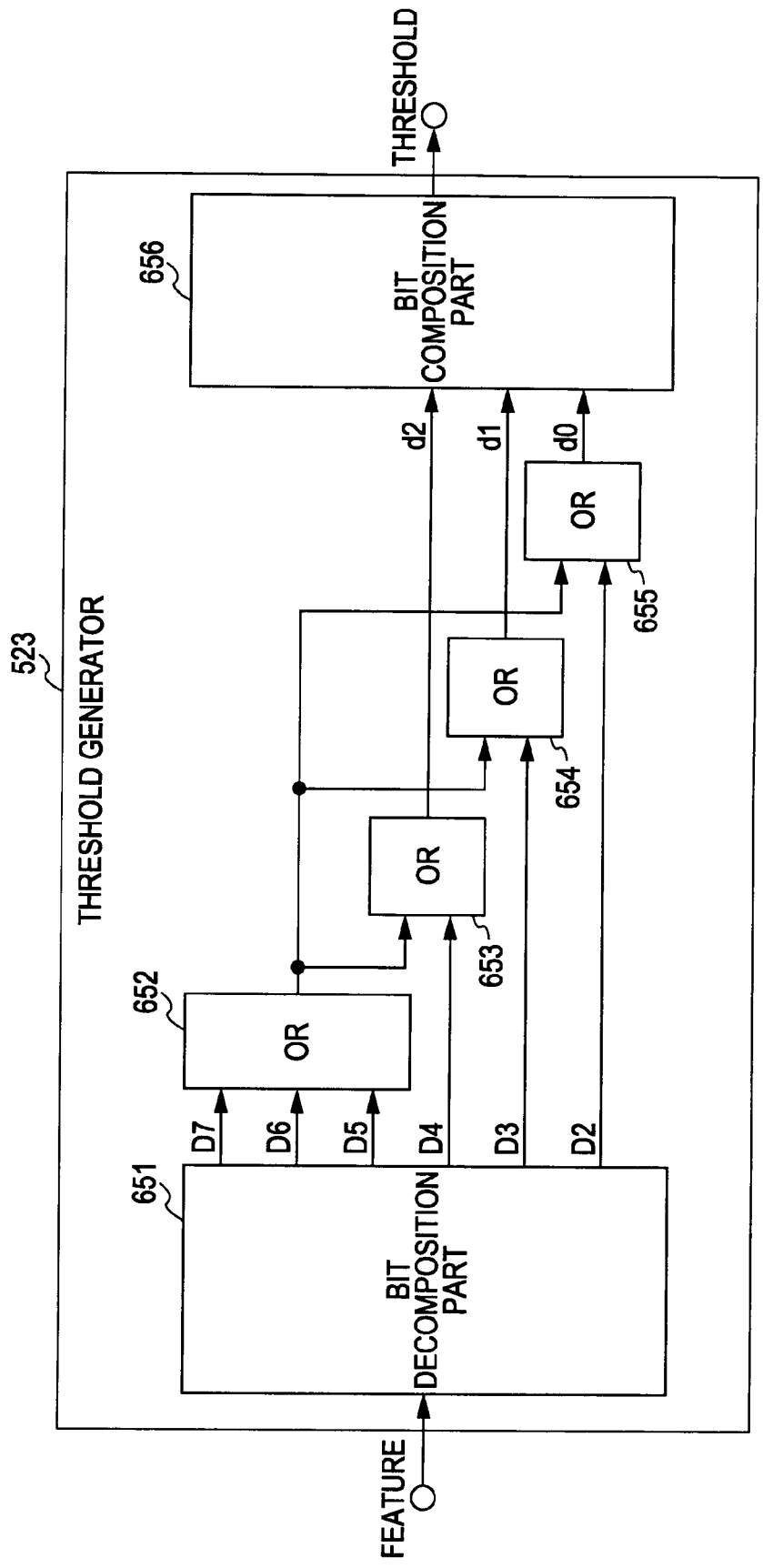
FIG. 16 is a block diagram of the structure of a threshold generator.

The threshold generator 523 generates a variable threshold from the dynamic range supplied from the feature memory 522. Referring to FIG. 16, the threshold generator 523 includes a bit decomposition part 651, OR circuits 652 to 655, and a bit composition part 656.

The bit decomposition part 651 decomposes the dynamic range, expressed using eight bits, supplied from the feature memory 522 into bits D7 to D2. The bit D7 is the most significant bit (MSB). The three high-order bits D7 (MSB) to D5 are supplied to the OR circuit 652. The OR circuit 652 performs a logical OR operation and outputs the result of the logical OR operation to the OR circuits 653 to 655. The OR circuit 653 performs a logical OR operation between the output of the OR circuit 652 and the bit D4 and outputs the result of the logical OR operation as a bit D2 to the bit composition part 656. The OR circuit 654 implements a logical OR operation between the output of the OR circuit 652 and the bit D3 and outputs the result of the logical OR operation as a bit d1 to the bit composition part 656. The OR circuit 655 performs a logical OR operation between the output of the OR circuit 652 and the bit D2 and outputs the result of the logical OR operation as a bit d0 to the bit composition part 656.

The bit composition part 656 assigns the bit d2 to the MSB, assigns the bit d0 to the least significant bit (LSB), and composes the three bits d2 to do into data. The data is composed of the three bits d2, d1, and d0 in the order of decreasing significance in the byte and has a value in the range of "000" to "111". The bit composition part 656 converts this data into a decimal number and outputs the resultant value in the range of 0 to 7 as a threshold to the comparator 531.

Figure 17:
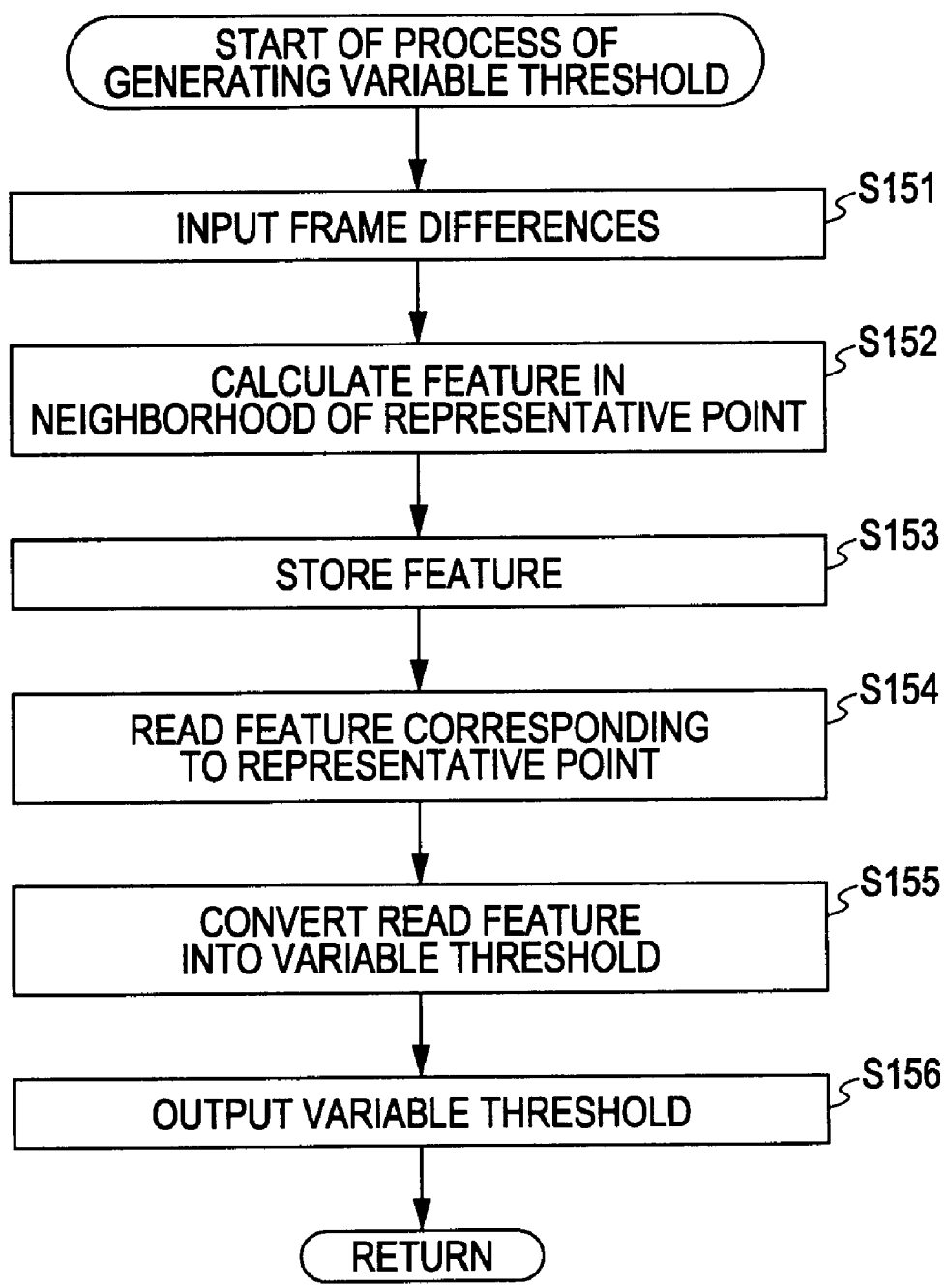
FIG. 17 is a flowchart explaining a process of generating a variable threshold.

The process of generating a variable threshold in step S103 in FIG. 12 will now be described in detail with reference to a flowchart of FIG. 17.

In step S151, the feature extractor 521 receives the frame differences output from the subtractor 512. Each frame difference serves as difference data regarding the difference in pixel value between each representative point and each pixel of the search area of successive frames. In step S152, the feature extractor 521 calculates a feature in the neighborhood of the representative point. In step S153, the feature memory 522 stores the feature.

Figure 18:
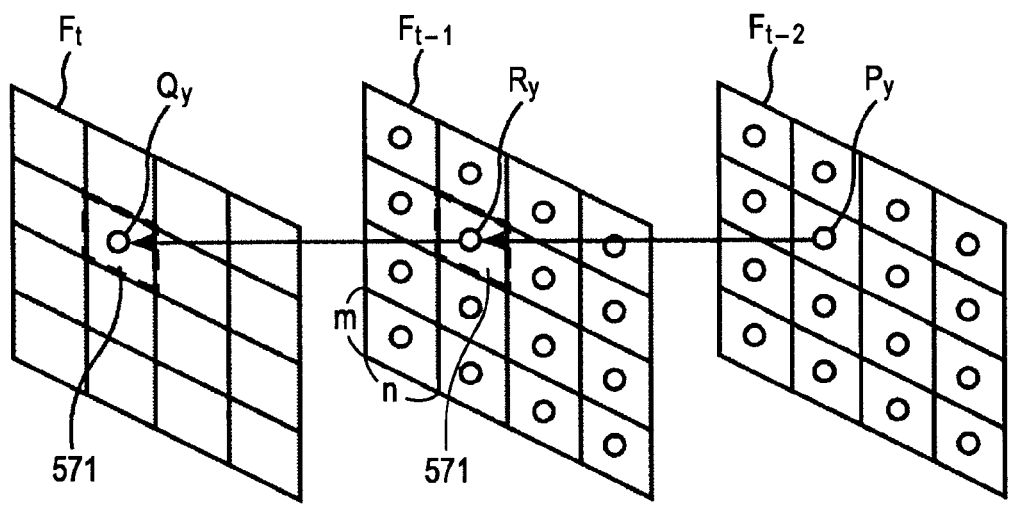
FIG. 18 is a diagram explaining a dynamic range in the neighborhood of a representative point.
Figure 19:
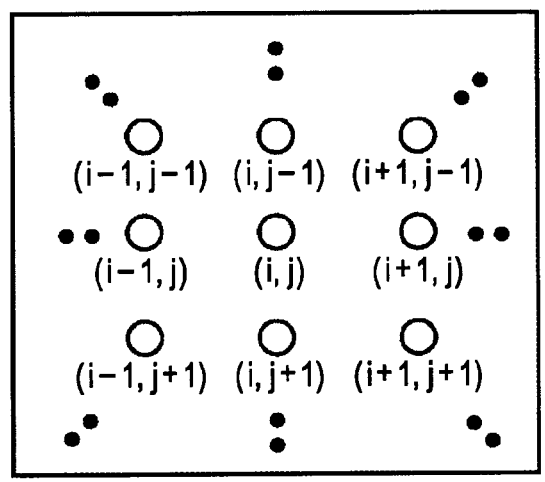
FIG. 19 is a diagram explaining the neighborhood of a representative point.

For example, it is assumed that a second previous frame $F_{t-2}$ of the current frame $F_t$ has a representative point $P_y$, the first previous frame $F_{t-1}$ thereof has the representative point $R_y$ as shown in FIG. 18, and difference data blocks regarding the differences between the representative point $P_y$ and 3×3 (=9) pixels, shown in FIG. 19, in the neighborhood of the representative point $R_y$ are input to the feature extractor 521.

The difference data blocks regarding the differences between the representative point $P_y$ and the nine pixels located in the range of coordinates (i−1, j−1) to coordinates (i+1, j+1) are sequentially input to the feature extractor 521. The maximum-value detection part 601 and the minimum-value detection part 603 obtain a maximum value and a minimum value in the difference data blocks, respectively. First input difference data is stored in the registers 602 and 604 through the maximum-value detection part 601 and the minimum-value detection part 603. The first input difference data is compared to subsequently input difference data in each of the maximum-value detection part 601 and the minimum-value detection part 603. A maximum difference value is stored in the register 602. A minimum difference value is stored in the register 604. The above-described processing is repeated, thus obtaining the maximum value and the minimum value of the differences between the representative point $P_y$ and the nine pixels in the range of the coordinates (i−1, j−1) to the coordinates (i+1, j+1).

The subtractor 605 subtracts the obtained minimum value from the obtained maximum value and outputs the result of subtraction as a dynamic range (DR) in the neighborhood of the representative point $R_y$, i.e., the dynamic range of the nine pixels in the range of the coordinates (i−1, j−1) to the coordinates (i+1, j+1) to the feature memory 522 through the latch circuit 606. The feature memory 522 stores the dynamic range.

The dynamic range in the neighborhood of the representative point $R_y$ is a value expressed by the difference between the maximum value and the minimum value of the pixel values of the nine pixels shown in FIG. 19. The frame differences between the representative point $P_y$ of the second previous frame $F_{t-2}$ and the nine pixels correspond to changes in DC component of the nine pixels. Accordingly, the difference between the maximum value and the minimum value of the frame differences of the nine pixels is the same value as the dynamic range obtained from the frame differences between the representative point $P_y$ and the nine pixels.

An example will now be described using specific pixel values. It is assumed that the nine pixel values of the first previous frame $F_{t-1}$ have values (brightness levels) of 10, 11, 7, 9, 9, 12, 15, 11, and 8, respectively, and the representative point $P_y$ of the second previous frame $F_{t-2}$ has a pixel value of 11. In this case, the frame differences between the representative point $P_y$ and the nine pixels of the first previous frame $F_{t-1}$ are as follows:

10−11=−1
11−11=0
7−11=−4
9−11=−2
9−11=−2
12−11=+1
15−11=+4
11−11=0
8−11=−3

The dynamic range (DR) obtained on the basis of the above-described nine difference data blocks by the feature extractor 521 has a value obtained by subtracting the minimum value "−4" from the maximum value "+4" in the above-described nine values. The dynamic range has a value "8". On the other hand, the dynamic range directly obtained from the pixel values (10, 11, 7, 9, 9, 12, 15, 11, 8) of the nine pixels in the first previous frame $F_{t-1}$ is expressed by 15 (maximum value)−7 (minimum value)=8. Therefore, either of the dynamic ranges has a value "8". The above-described dynamic ranges have the same value.

As described above, the dynamic range in the neighborhood of the representative point in the first previous frame $F_{t-1}$ can be calculated using the result of correlation in representative point matching between the second previous frame $F_{t-2}$ and the first previous frame $F_{t-1}$ by the correlation arithmetic section 501, i.e., the frame difference data. The dynamic range (DR) is used as a feature as a spatial variation.

In step S154, the feature memory 522 reads data regarding the dynamic range (DR) corresponding to the representative point. In step S155, the threshold generator 523 converts the read dynamic range (DR) into a variable threshold. In step S156, the threshold generator 523 outputs the variable threshold to the correlation determination section 502.

In other words, data regarding the dynamic range (DR), calculated on the basis of the frame difference data by the feature extractor 521, is supplied to the bit decomposition part 651 of the threshold generator 523. This data is 8-bit data regarding the pixel value difference.

The bit decomposition part 651 decomposes the input 8-bit data representing the dynamic range (DR) into bits including the MSB to extract six higher significant bits D7 to D2.

The OR circuit 652 receives the three higher significant bits D7, D6, and D5 from the MSB, implements the logical OR operation, and outputs 1-bit data representing the result of the logical OR operation. When any or all of the three bits D7, D6, and D5 includes a bit value "1", the value "1" is output.

Further, the output of the OR circuit 652 and the bit D4 output from the bit decomposition part 651 are supplied to the OR circuit 653. The result of the logical OR operation is output from the OR circuit 653. Further, the output of the OR circuit 653 and the bit D3 output from the bit decomposition part 651 are supplied to the OR circuit 654. The result of the logical OR operation is output from the OR circuit 654. Further, the output of the OR circuit 654 and the bit D2 output from the bit decomposition part 651 are supplied to the OR circuit 655. The result of the logical OR operation is output from the OR circuit 655.

The three bits d2, d1, and d0 output from the respective OR circuits 653, 654, and 655 are supplied to the bit composition part 656. The bit composition part 656 converts data, composed of the three bits d2, d1, and d0 in the order of descending significance in the byte, in the range of "000" to "111" into a decimal number and then outputs a value in the range of 0 to 7 as a threshold. As described above, the threshold generator 523 calculates a threshold using bit data compression on bits constituting data regarding the dynamic range in the neighborhood of the representative point, the dynamic range serving as a feature as a spatial variation in the neighborhood of the pixel of interest.

Figure 20:
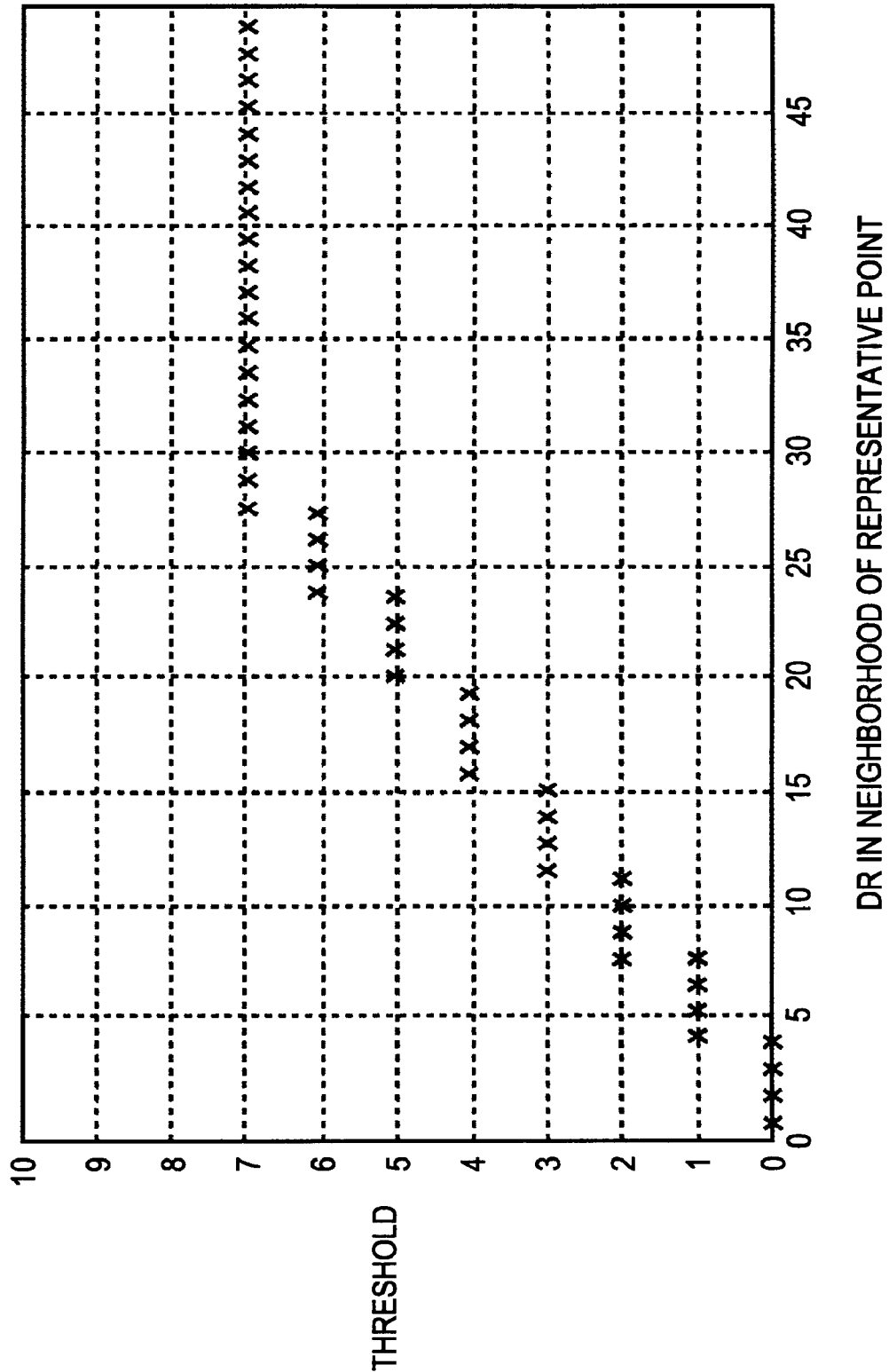
FIG. 20 is a graph showing the characteristics of a variable threshold.

FIG. 20 is a graph showing the relationship between inputs and outputs of the threshold generator 523. The graph shows a variable threshold calculated on the basis of the dynamic range (DR) plotted against the dynamic range (DR) calculated on the basis of the frame differences supplied to the variable-threshold generation section 503. A threshold changes in a stepwise manner with respect to a change in dynamic range as shown in FIG. 20.

For example, when the dynamic range (DR) has a value in the range of 0 to 3, a variable threshold "0" is output to the correlation determination section 502. When the dynamic range (DR) has a value in the range of 4 to 7, a variable threshold "1" is output to the correlation determination section 502. When the dynamic range (DR) has a value of 28 or more, a variable threshold output to the correlation determination section 502 is limited to 7. The output variable threshold does not exceed 7.

When the dynamic range (DR) is small, that is, the image is flat, the threshold is set to a relatively low value. In correlation determination by the correlation determination section 502, therefore, the presence or absence of correlation can be relatively accurately performed.

Again referring to FIG. 12, after completion of the process of generating a variable threshold in step S103, in step S104, the comparator 531 of the correlation determination section 502 compares the frame difference absolute value output from the absolute-value calculator 513 of the correlation arithmetic section 501 with a variable threshold output from the threshold generator 523 of the variable-threshold generation section 503 to obtain a evaluation value represented by 1-bit data. When the frame difference absolute value is lower than the variable threshold, 1-bit data indicative of "1", representing the presence of correlation is output through the gate 544 to the evaluation-value-table calculation section 505. When the frame difference absolute value is higher than the threshold value, 1-bit data indicative of "0" representing the absence of correlation is output through the gate 544 to the evaluation-value-table calculation section 505.

In step S105, the representative-point selection section 504 selects representative points. Peaks of the evaluation value table are used for selection of candidate vectors. However, it is necessary to detect a peak in a still area as a peak of the evaluation value table. Since moving image data has a still area in many cases, a still vector is set as a default candidate vector. It is therefore unnecessary to generate a peak corresponding to the still vector as a peak of the evaluation value table.

If a peak corresponding to a still area is generated in the evaluation value table, other peaks corresponding to candidate vectors representing the presence of motion are made difficult to see by the generated peak. Therefore, the result of correlation determination of a representative point in a still area represents the frequency of occurrence of decreasing the reliability of the evaluation value table.

The comparator 542 determines whether the representative point $R_y$ of the first previous frame $F_{t-1}$ is located in a still area. The determination will be called standstill determination in the following description. Standstill determination by the comparator 542 will now be described with reference to FIG. 18. Standstill determination on the representative point $R_y$ of the first previous frame $F_{t-1}$ is based on not the frame difference between the representative point $R_y$ of the first previous frame $F_{t-1}$ and a point $Q_y$ of the current frame $F_t$ but the frame difference between the representative point $R_y$ of the first previous frame $F_{t-1}$ and the representative point $P_y$ of the second previous frame $F_{t-2}$. The reason is as follows: In the use of the frame difference between the points $R_y$ and $Q_y$, standstill determination on the representative point $R_y$ is performed only when data regarding the point $Q_y$ of the current frame $F_t$ is supplied. In the use of the frame difference between the points $R_y$ and $P_y$, however, the results of standstill determination on representative points existing in the first previous frame $F_{t-1}$ are obtained after all of data regarding the first previous frame $F_{t-1}$ have been supplied.

In addition, since the absolute value of the frame difference between the representative point $R_y$ of the first previous frame $F_{t-1}$ and the representative point $P_y$ of the second previous frame $F_{t-2}$ is calculated by correlation arithmetic operation on the representative point $P_y$ of the second previous frame $F_{t-2}$, this absolute value can be used.

The comparator 542 receives the absolute value of the frame difference between the representative point $R_y$ of the first previous frame $F_{t-1}$ and the representative point $P_y$ of the second previous frame $F_{t-2}$ calculated by the absolute-value calculator 513. When the frame difference absolute value is lower than the reference value stored in the reference-value memory 541, the comparator 542 determines that the representative point $R_y$ of the first previous frame $F_{t-1}$ is located in a still area and stores a still flag "0" in the flag memory 543.

On the other hand, when the absolute value of the frame difference between the representative point $R_y$ of the first previous frame $F_{t-1}$ and the representative point $P_y$ of the second previous frame $F_{t-2}$ calculated by the absolute-value calculator 513 is higher than the reference value stored in the reference-value memory 541, the comparator 542 determines that the representative point $R_y$ of the first previous frame $F_{t-1}$ is not located in a still area and stores a motion flag "1" in the flag memory 543.

Further, the flag memory 543 reads a flag indicative of representative-point standstill determination at predetermined timing. When the read flag is the still flag "0", the flag memory 543 outputs a low-level (L) signal to the gate 544, thus turning off the gate 544. Consequently, even when the comparator 531 of the correlation determination section 502 determines the presence of correlation, the evaluation value "1" is not supplied to the evaluation-value accumulator 551 and is not counted as a frequency to be added in a frequency-distribution evaluation value table.

On the other hand, when the read flag is the motion flag "1", the flag memory 543 outputs a high-level (H) signal to the gate 544, thus turning on the gate 544. Consequently, when the comparator 531 of the correlation determination section 502 determines the presence of correlation, the output evaluation value "1" is counted as a frequency to be added in the frequency-distribution evaluation value table.

As described above, whether a representative point is located in a still area is determined on the basis of the frame difference absolute value as the result of representative point matching executed by the correlation arithmetic section 501. Since the correlation determination section 502 does not output the result of correlation determination obtained when the representative point is located in the still area, the evaluation value "1" indicative of the presence of correlation between representative points in still areas is not counted as a frequency in the frequency-distribution evaluation value table. The evaluation value "1" indicative of the presence of correlation between representative points located outside still areas is selected as an effective evaluation value and is then output. This output evaluation value is counted as a frequency in the frequency-distribution evaluation value table. Consequently, the reliable evaluation value table with an enhanced peak corresponding to motion can be generated.

In step S106, the evaluation-value accumulator 551 of the evaluation-value-table calculation section 505 accumulates the input 1-bit evaluation values to generate an evaluation value table and stores the table in the evaluation-value-table memory 552.

In other words, the evaluation-value accumulator 551 performs a process of accumulating the number (frequency) of bit values "1" as the evaluation values supplied from the comparator 531 through the gate 544, thus generating the frequency-distribution evaluation value table representing whether the results of determination of the presence of correlation are many. In the frequency-distribution evaluation value table, when there is a correlation between a representative point and a reference point in each shift (i, j) in the search area, the frequency of the shift is incremented. The frequency-distribution evaluation value table is generated by accumulating the results of correlation determination on all representative points in one frame. In other words, the frequency f(i, j) of each shift (i, j) in the evaluation value table represents the number of times of establishment of the correlation between the representative point and the reference point. A peak (extreme) corresponding to the motion of a display object in a frame of moving image data appears in the generated evaluation value table.

The evaluation value table, i.e., the frequency-distribution evaluation value table is generated by accumulating 1-bit data indicative of the presence or absence of correlation without performing a process of accumulating 8-bit data, serving as the difference between 8-bit data indicative of the pixel value of a representative point and 8-bit data indicative of the pixel value of a comparative point in a search area.

Figure 21:
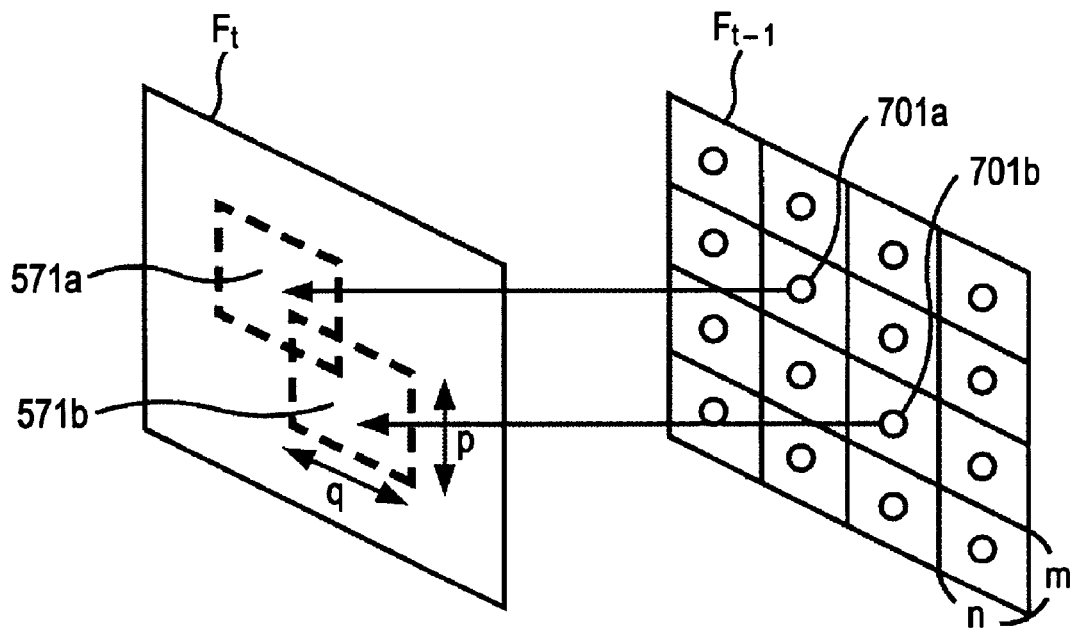
FIG. 21 is a diagram explaining the correspondence between representative points and search areas.

The above description will be summarized as follows: The current frame $F_t$ at time (t) and the previous frame $F_{t-1}$ at time (t−1) are extracted as successive frame images constituting a moving image as shown in FIG. 21. For example, the current frame $F_t$ is set to a reference frame. The previous frame $F_{t-1}$ is divided into a plurality of blocks each including m×n pixels. Representative points 701a and 701b representing some blocks are set.

Search areas 571a and 571b corresponding to the respective representative points may overlap with each other as shown in FIG. 21. In this example shown in FIG. 21, the search area 571a corresponding to the representative point 701a of the block set in the previous frame $F_{t-1}$ and the other search area 571b corresponding to the representative point 701b in the previous frame $F_{t-1}$ are set such that those search areas overlap with each other.

As described above, each search area is related to the corresponding representative point and the pixel value of each pixel in the search area is compared with that of the corresponding representative point. An evaluation value is set on the basis of the comparison. For example, as the degree of correlation (the degree of matching between the pixel values) is higher, the evaluation value is set higher. Evaluation values corresponding to the respective pixels in each search area are set.

Figure 22:
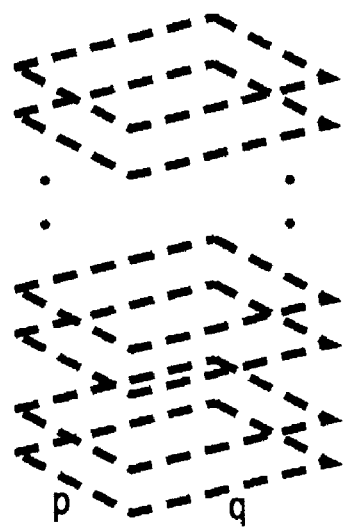
FIG. 22 is a diagram explaining accumulation of evaluation values.
Figure 23:
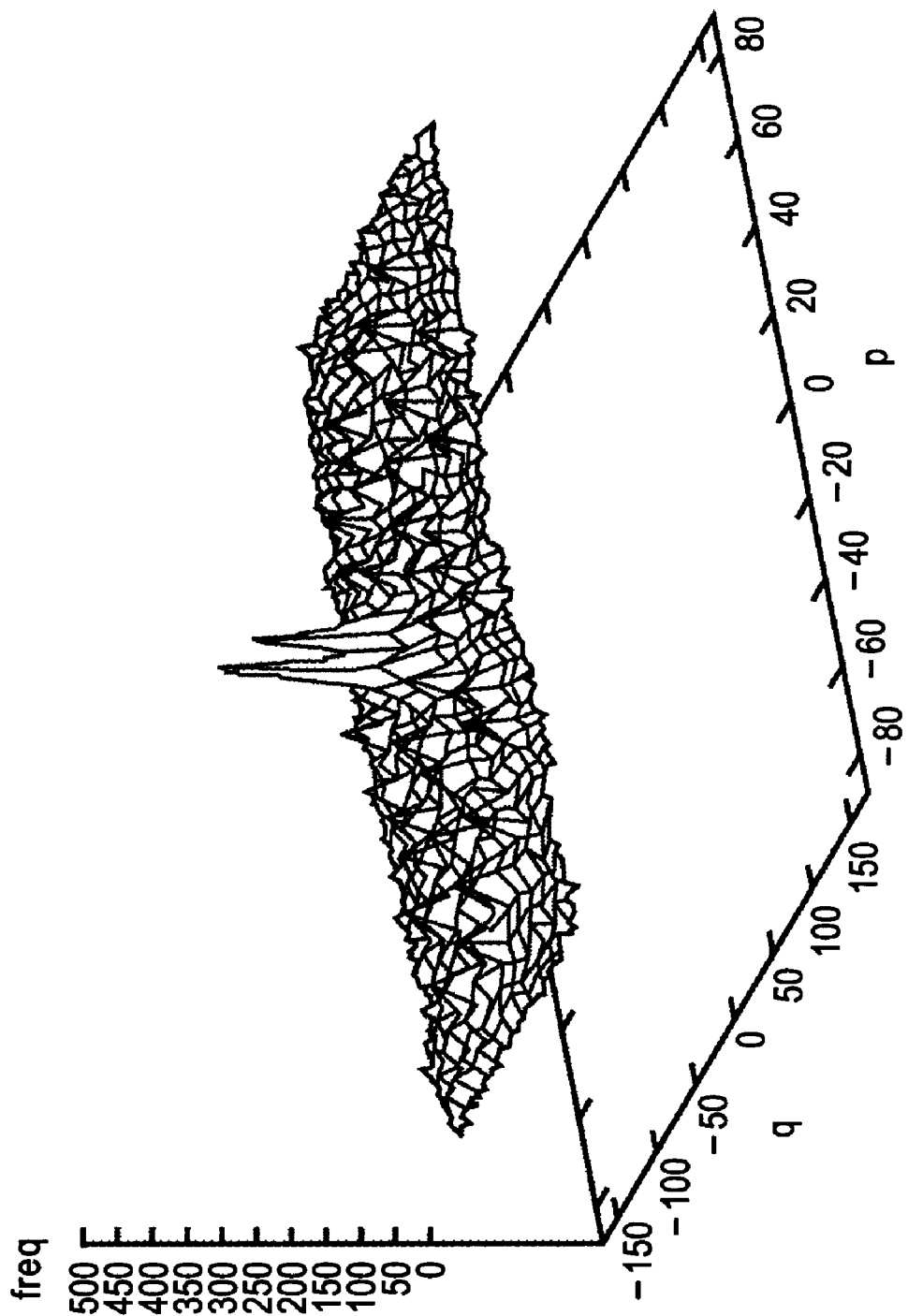
FIG. 23 is a diagram showing an example of an evaluation value table.

The evaluation values in each search area are accumulated as shown in FIG. 22. Consequently, an evaluation value table is generated as shown in FIG. 23. The evaluation value table is calculated as accumulation of the evaluation values based on the comparison between each of pixels in a search area set in the current frame $F_t$, serving as a reference frame, and each of the representative points $R_{y1}$ to $R_{yn}$ of, for example, n blocks in the previous frame $F_{t-1}$. The evaluation value table has the same size as that of the search area. Referring to FIG. 23, a value p is in the range of "−88" to "+88" and a value q is in the range of "−164" to "+164".

Again referring to FIG. 7, the process of generating the lower level evaluation value table is performed in step S32. After that, the extraction unit 244 extracts candidate vectors using the lower level evaluation value table in step S33.

In the evaluation value table, when there is high correlation between the pixel value in each shift position (i, j) in the search area and a representative point, a peak (extreme) appears. The peak in the evaluation value table corresponds to the movement of a display object in a frame of moving image data.

For example, when the whole frame has the same movement, one peak appears in a position corresponding to the end point of a vector having the direction of motion and the length in the evaluation value table having the same size as that of the search area (p×q). When two objects with different motions exist in the frame, two peaks appear in two positions corresponding to the end points of two vectors having different directions of motion and different lengths. When the frame includes a still portion in principle, a peak corresponding to the still portion also appears. However, the gate 544 suppresses the occurrence of the peak corresponding to the still portion.

Larger peaks are selected from the peaks in the evaluation value table, so that candidates for a motion vector between the previous frame $F_{t-1}$ and the current frame $F_t$, serving as the reference frame, are obtained as candidate vectors.

In step S34, the higher level table generation unit 231 performs a process of generating a higher level evaluation value table. Accordingly, the higher level table generation unit 231 receives the subband component of LL/4, serving as a higher level image signal shown in FIG. 13B from the adder 425 of the inverse wavelet transform unit 316 in FIG. 10. Since the higher level evaluation value table generating process by the higher level table generation unit 231 is fundamentally similar to the lower level evaluation value table generating process by the lower level table generation unit 232 in step S32, a description of the process is omitted.

The higher level evaluation value table generating process can also be performed using the subband component of LLLL/16 shown in FIG. 13C higher than the subband component of LL/4, serving as a higher level image signal shown in FIG. 13B. In this case, the subband component of LLLL/16 shown in FIG. 10 is supplied as it is to the higher level table generation unit 231. The higher level evaluation value table generating process can also be performed using each of the subband components of LL/4 and LLLL/16.

Figure 25:
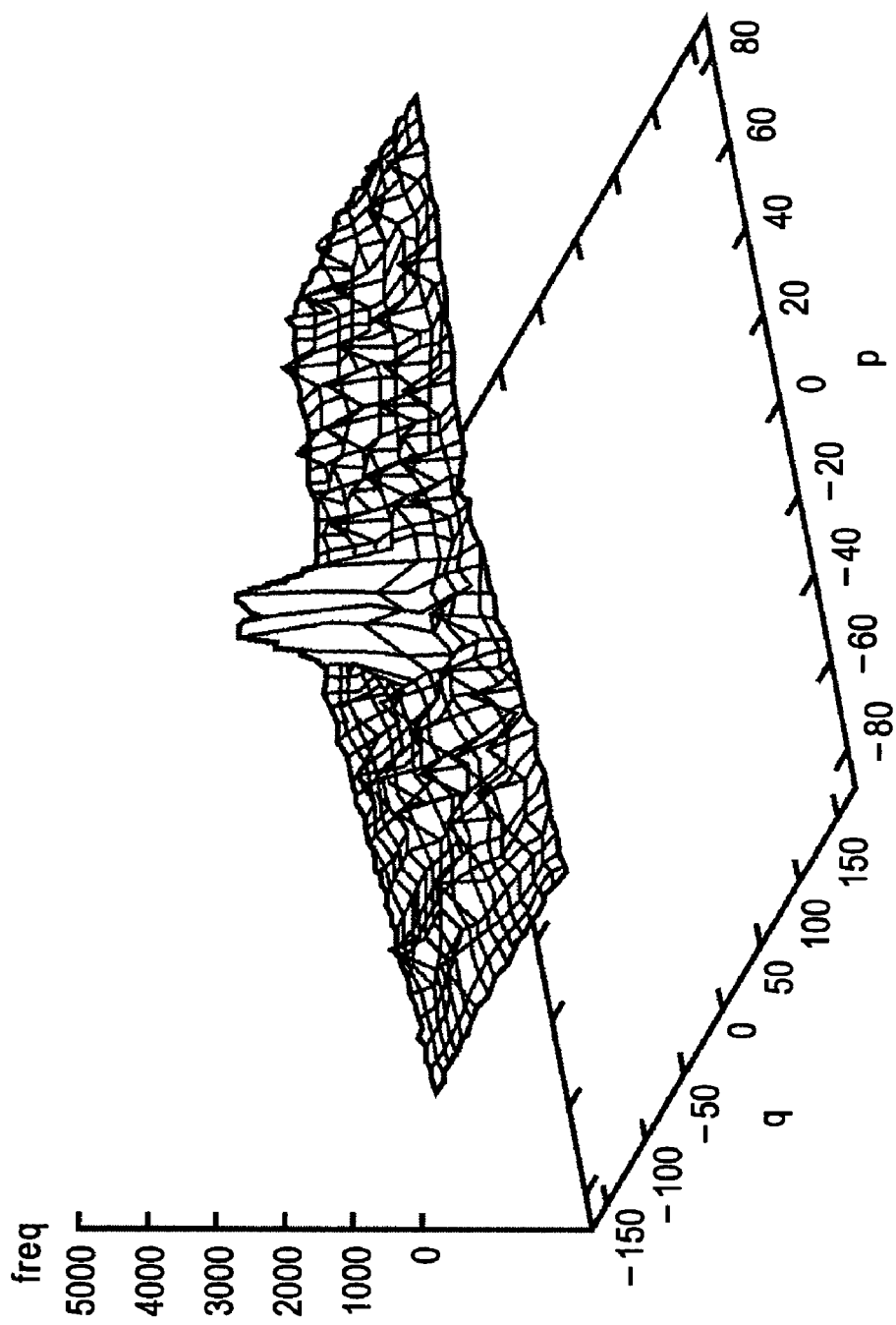
FIG. 25 is a diagram showing an example of an expanded evaluation value table.

In step S35, the expansion unit 241 expands the size of the higher level evaluation value table. For example, one pixel P1 is expanded to 2×2 subpixels as shown in FIG. 24. Other pixels P2 to P4 are similarly expanded. Thus, the size of the higher level evaluation value table generated by the higher level table generation unit 231 can be expanded so as to correspond to that of the lower level evaluation value table generated by the lower level table generation unit 232. The original size of the higher level evaluation value table is ¼ of that of the lower level evaluation value table. FIG. 25 shows an example of the higher level evaluation value table expanded as described above. The size thereof is the same as that of the lower level evaluation value table shown in FIG. 23.

Expansion by the expansion unit 241 can be performed by linear interpolation between pixels.

In step S36, the correction unit 242 normalizes the higher level evaluation value table. Specifically, a maximum value of respective pixel values in the higher level evaluation value table is obtained and each of the respective values in the table is divided by the maximum value. In other words, assuming that let u be each value in the higher level evaluation value table and let u_max be the maximum value, the following expression is calculated:

$$u/u\_\max.$$

In step S37, the correction unit 242 corrects the lower level evaluation value table on the basis of the higher level evaluation value table. Specifically, assuming that let c be a value in each position expressed using coordinates in the lower level evaluation value table and let u be a value in each position expressed using coordinates in the higher level evaluation value table, the following expression is calculated:

$$f(c,u)=c\times(1.0+k(u/(u\_\max))) \qquad (6).$$

Figure 26:
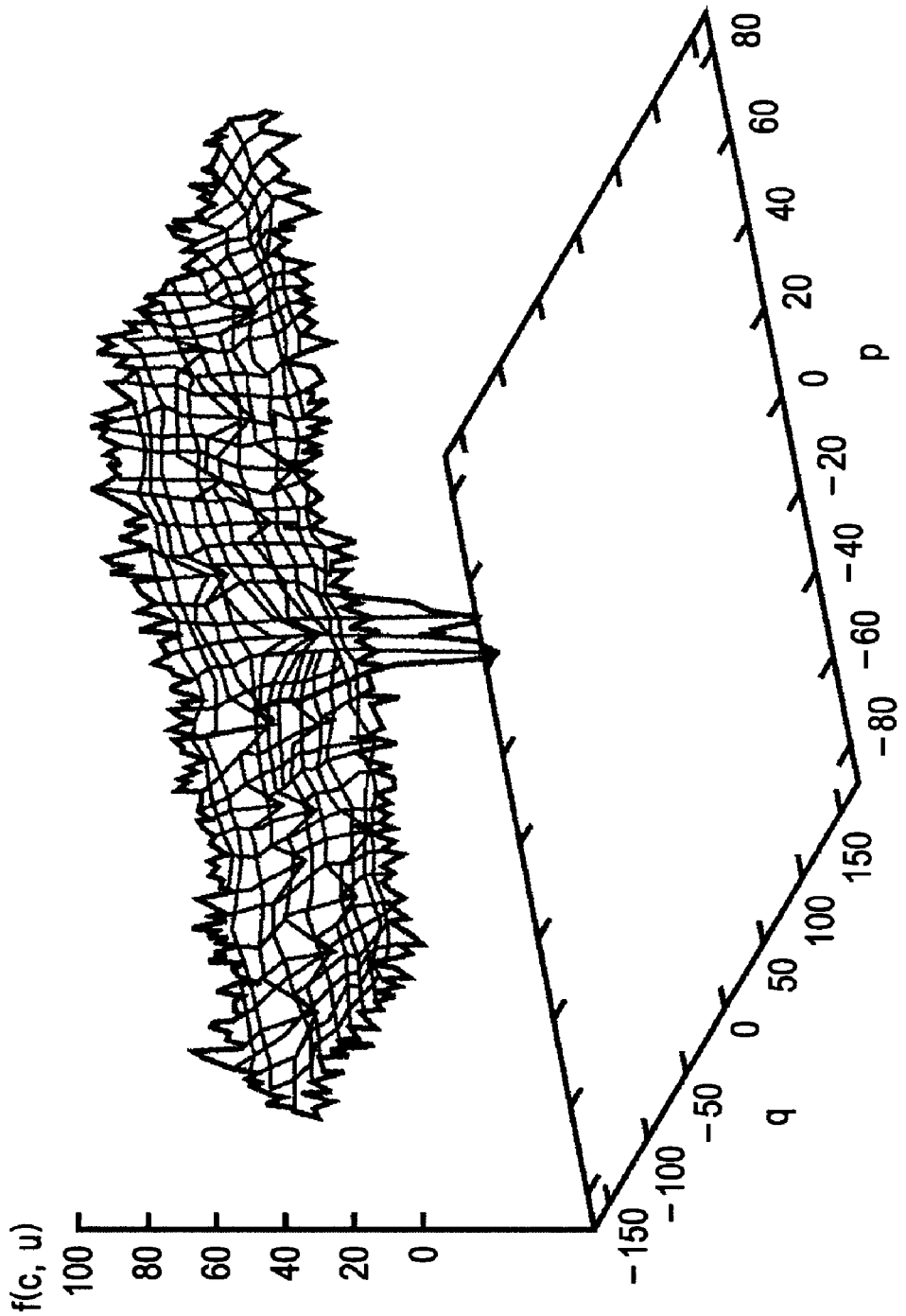
FIG. 26 is a diagram showing an example of a corrected evaluation value table.

FIG. 26 shows an example of the corrected lower level evaluation value table in FIG. 23. The lower level evaluation value table is corrected using the normalized values of the expanded higher level evaluation value table shown in FIG. 25.

In step S38, the extraction unit 243 extracts candidate vectors by selecting larger peaks using the lower level evaluation value table corrected in step S37. In step S39, the composition unit 245 composes candidate vectors. In other words, the candidate vectors extracted by the extraction unit 244 in step S33 and the candidate vectors extracted by the extraction unit 243 in step S38 are used as the candidate vectors. In step S40, the motion vector detection module 214 selects the most suitable candidate vector from the composed candidate vectors and sets the selected candidate vector as a motion vector corresponding to respective pixels.

A process of setting a motion vector corresponding to respective pixels on the basis of the extracted candidate vectors will now be described with reference to FIG. 27.

Figure 27:
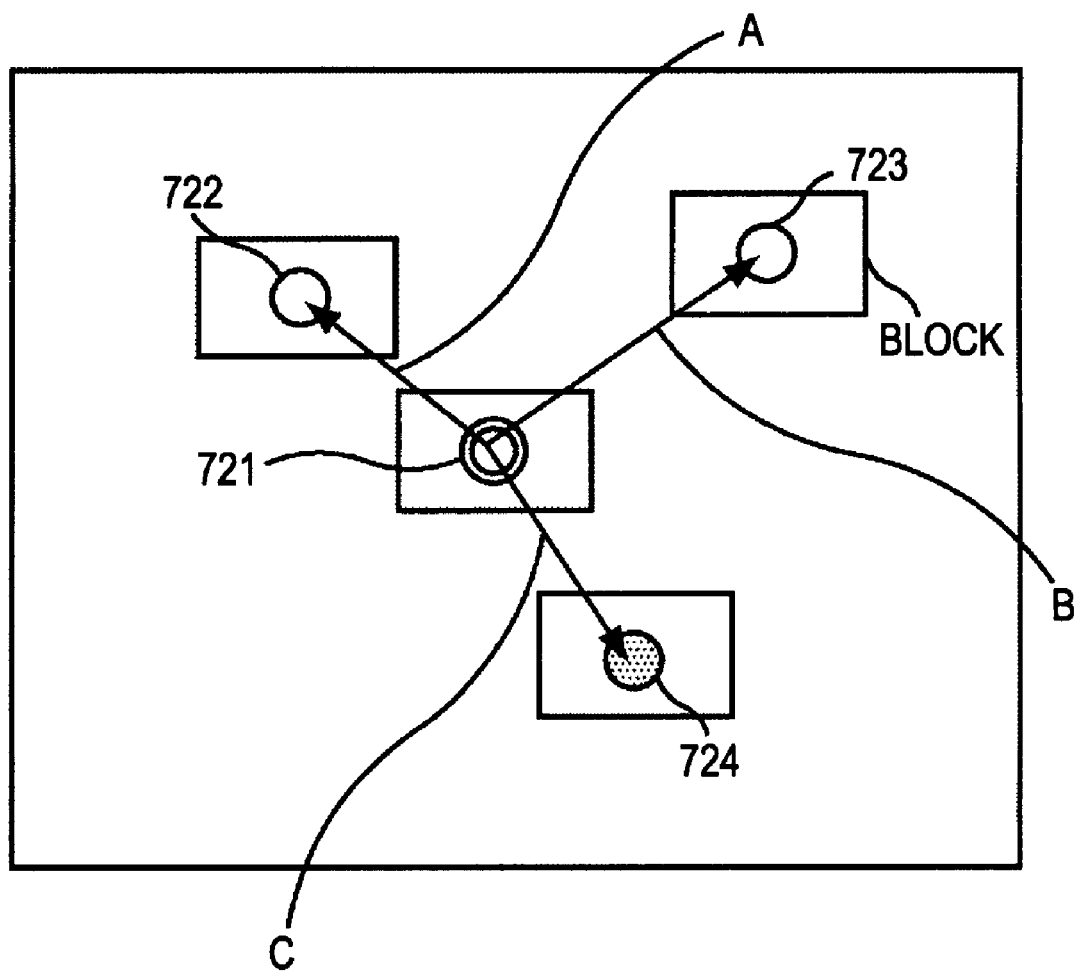
FIG. 27 is a diagram explaining detection of a motion vector.

Referring to FIG. 27, a center pixel 721 represents one pixel of the previous frame $F_{t-1}$. This pixel has, for example, a brightness level of "α". A plurality of candidate vectors have been extracted on the basis of peaks appeared in the above-described evaluation value table. The extracted vectors are candidate vectors A, B, and C shown in FIG. 27. It is determined that the pixel 721 of the previous frame $F_{t-1}$ is moved in accordance with any of those candidate vectors and is displayed in a position corresponding to any pixel of the current frame $F_t$.

In FIG. 27, pixels 722, 723, and 724 belong to the current frame $F_t$ and are located in positions, which are estimated as the destinations of the pixel 721 of the previous frame $F_{t-1}$ on the basis of the candidate vectors A, B, and C. The correlation of pixel values between each of blocks respectively including the above-described three pixels and the block including the pixel 721 is determined by block matching. A combination having the highest correlation is selected and the candidate vector set in the combination is set to a motion vector of the pixel 721.

Figure 28:
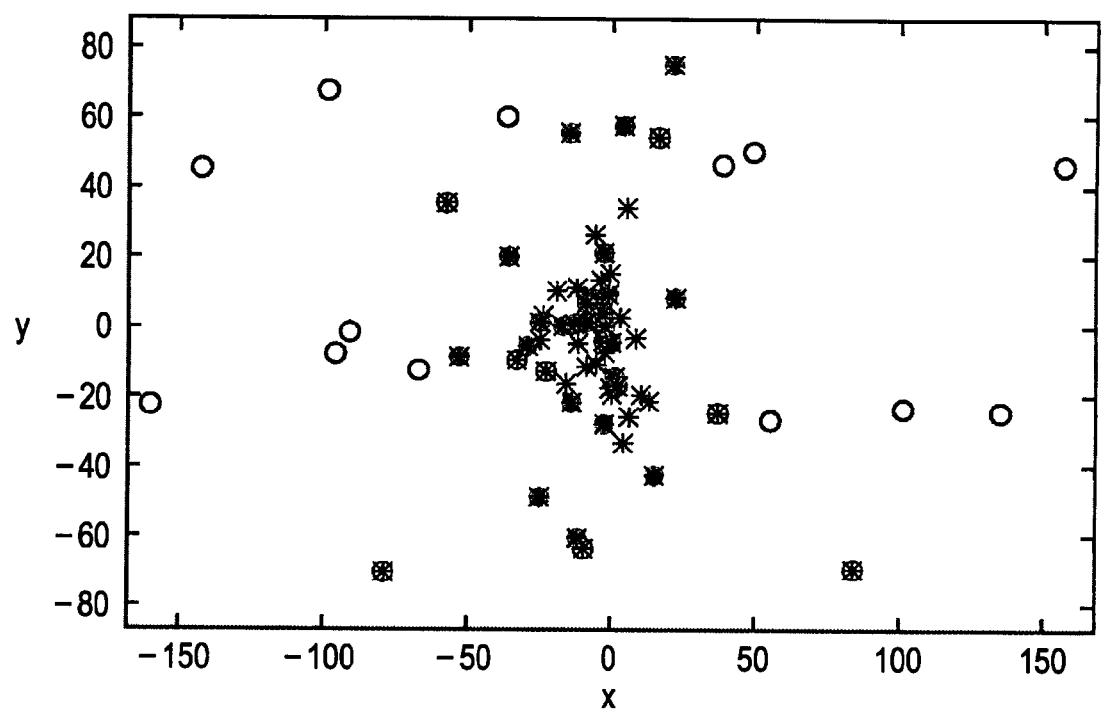
FIG. 28 is a graph explaining candidate vectors.

FIG. 28 shows an example of composition of candidate vectors in the evaluation value table. Referring to FIG. 28, hatched circles represent candidate vectors (top 32 candidate vectors extracted through the extraction unit 244) adopted by selecting top 32 peak values using only the lower level evaluation value table. Asterisks represent candidate vectors (top 64 candidate vectors extracted through the extraction unit 244) adopted by selecting top 64 peak values using only the lower level evaluation value table. Blank circles represent candidate vectors (top 32 candidate vectors extracted through the extraction unit 243) adopted by selecting top 32 peak values using the lower level evaluation value table corrected based on the higher level evaluation value table.

As for the candidate vectors extracted using only the lower level evaluation value table through the extraction unit 244, either the 32 candidate vectors (i.e., the top 32 candidate vectors extracted by the extraction unit 244) or the 64 candidate vectors (i.e., the top 64 candidate vectors extracted by the extraction unit 244) are locally concentrated. On the other hand, the candidate vectors extracted using the lower level evaluation value table corrected based on the higher level evaluation value table, i.e., the top 32 candidate vectors extracted through the extraction unit 243 are distributed as compared with the arrangement of the candidate vectors extracted using only the lower level evaluation value table, i.e., the candidate vectors extracted through the extraction unit 244.

Figure 29:
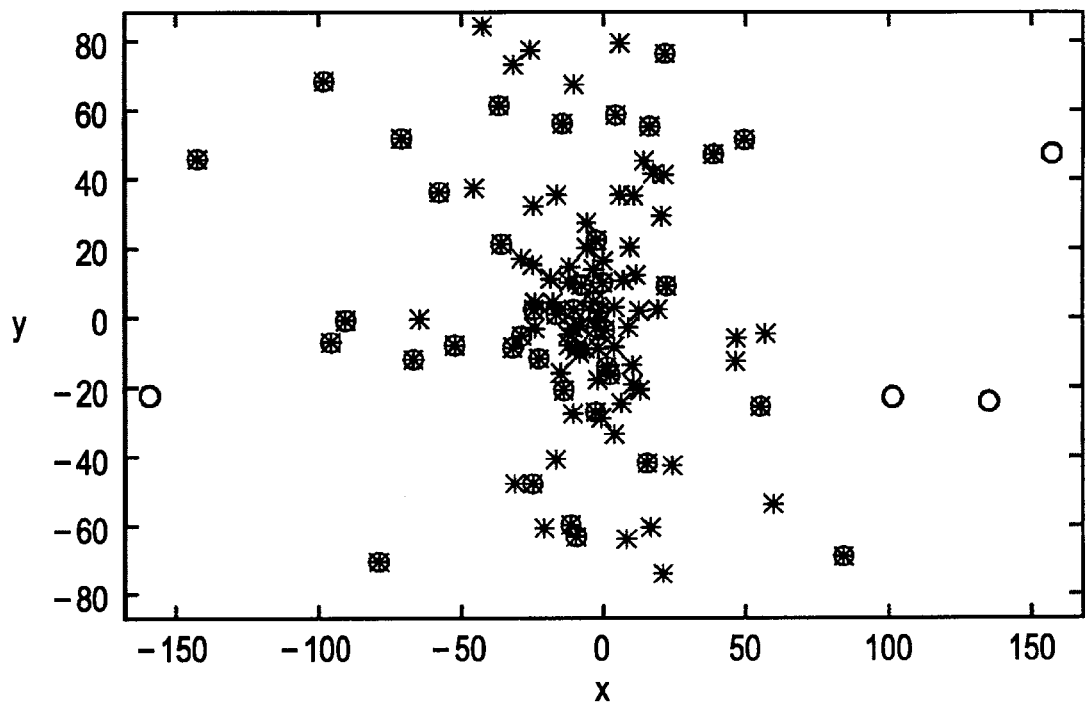
FIG. 29 is a graph explaining candidate vectors.

Referring to FIG. 29, asterisks represent candidate vectors (top 128 candidate vectors extracted through the extraction unit 244) adopted by selecting top 128 peak values using only the lower level evaluation value table. Blank circles represent candidate vectors (top 32 candidate vectors extracted through the extraction unit 243) adopted by selecting top 32 peak values using the lower level evaluation value table corrected based on the higher level evaluation value table and candidate vectors (top 32 candidate vectors extracted through the extraction unit 244) adopted by selecting top 32 peak values using only the lower level evaluation value table, i.e., a total of 64 candidate vectors. Although many of the latter 64 candidate vectors match the former 128 candidate vectors, some of them do not match the former candidate vectors.

As will be understood from the above description, candidate vectors are extracted from the lower level evaluation value table corrected based on the higher level evaluation value table, so that candidate vectors (therefore, a motion vector), which are not detected by increasing the number of candidate vectors extracted from the lower level evaluation value table, can be detected. Consequently, the motion vector of a small-area moving object, which generally has low evaluation values and is difficult to detect, can be detected.

In the above description, a motion vector is detected from image signals obtained by decoding image signals encoded using JPEG 2000. The present invention is applicable to a case where a motion vector is detected from image signals having another hierarchical structure.

FIG. 30 is a block diagram of the structure of a personal computer for executing the above-described series of processes in accordance with a program. A central processing unit (CPU) 821 executes various processes in accordance with the program stored in a read only memory (ROM) 822 or a storage unit 828. A random access memory (RAM) 823 appropriately stores the program executed by the CPU 821 and data. The CPU 821, the ROM 822, and the RAM 823 are connected to each other via a bus 824.

An input/output interface 825 is connected to the CPU 821 through the bus 824. An input unit 826 and an output unit 827 are connected to the input/output interface 825. The input unit 826 includes a keyboard, a mouse, and a microphone. The output unit 827 includes a display and a speaker. The CPU 821 executes various processes in response to commands entered from the input unit 826 and outputs the results of the processes to the output unit 827.

The storage unit 828, connected to the input/output interface 825, includes, for example, a hard disk and stores the program executed by the CPU 821 and various pieces of data. A communication unit 829 communicates with an external device through a network, such as the Internet or a local area network. The program may be obtained through the communication unit 829 and be stored into the storage unit 828.

A drive 830 is connected to the input/output interface 825. When a removable medium 831, such as a magnetic disk, an optical disk, a magneto-optical disk, or a semiconductor memory, is loaded into the drive 830, the drive 830 drives the removable medium 831 to obtain a program or data recorded on the medium. If necessary, the obtained program or data is transferred to the storage unit 828 and is stored therein.

When the above-described series of processes is executed by software, a program constituting the software is installed through a program recording medium into a computer incorporated in dedicated hardware or into a multi-purpose personal computer capable of executing various functions by installing various programs.

As shown in FIG. 30, program recording media for storing a computer-executable program to be installed into a computer include not only the removable medium (package medium) 831, such as a magnetic disk (including a flexible disk), an optical disk (e.g., a compact disc read-only memory (CD-ROM) or a digital versatile disc (DVD)), a magneto-optical disk, or a semiconductor memory, but also the ROM 822 and the hard disk constituting the storage unit 828, in each of which a program is temporarily or permanently recorded. If necessary, a program is stored into a program recording medium through the communication unit 829, serving as an interface, such as a router or a modem, using a wire or wireless communication medium, such as a local area network, the Internet, or digital satellite broadcasting.

In this specification, steps describing the program stored in a program recording medium include not only processing in which the steps are carried out in time series in the described order but also processing in which the steps are performed in parallel or individually rather than being implemented in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for detecting a motion vector, comprising:
   first generating means for generating a first evaluation value table from an image signal of a first level;
   second generating means for generating a second evaluation value table from an image signal of a second level higher than the first level;
   correcting means for correcting the first evaluation value table on the basis of the second evaluation value table;
   first extracting means for extracting first candidate vectors using the first evaluation value table;
   second extracting means for extracting second candidate vectors using the corrected first evaluation value table; and
   detecting means for detecting the motion vector from the first and second candidate vectors.

2. The apparatus according to claim 1, further comprising:
   relating means for relating the size of the second evaluation value table to that of the first evaluation value table, wherein
   the correcting means corrects the first evaluation value table using the second evaluation value table with the related size.

3. The apparatus according to claim 2, wherein the correcting means normalizes the second evaluation value table and corrects the first evaluation value table using the normalized second evaluation value table.

4. The apparatus according to claim 2, wherein the relating means expands evaluation values of the second evaluation value table as evaluation values in neighbor pixel positions to perform relating.

5. The apparatus according to claim 1, further comprising:
   output means for performing inverse wavelet transform on a wavelet-transformed image signal to output an image signal of the first level and that of the second level.

6. A method for detecting a motion vector, comprising the steps of:
   generating a first evaluation value table from an image signal of a first level;
   generating a second evaluation value table from an image signal of a second level higher than the first level;
   correcting the first level evaluation value table on the basis of the second evaluation value table;
   extracting first candidate vectors using the first evaluation value table;
   extracting second candidate vectors using the corrected first evaluation value table; and
   detecting the motion vector from the first and second candidate vectors.

7. A non-transitory computer-readable storage medium including computer executable instructions, wherein the instructions, when executed by a computer, cause the computer to perform a method, the method comprising:
   generating a first evaluation value table from an image signal of a first level;
   generating a second evaluation value table from an image signal of a second level higher than the first level;
   correcting the first level evaluation value table on the basis of the second evaluation value table;
   extracting first candidate vectors using the first evaluation value table;
   extracting second candidate vectors using the corrected first evaluation value table; and
   detecting a motion vector from the first and second candidate vectors.

8. An apparatus for detecting a motion vector, comprising:
   a first generation unit configured to generate, using a processor, a first evaluation value table from an image signal of a first level;
   a second generation unit configured to generate a second evaluation value table from an image signal of a second level higher than the first level;
   a correction unit configured to correct the first evaluation value table on the basis of the second evaluation value table;
   a first extraction unit configured to extract first candidate vectors using the first evaluation value table;
   a second extraction unit configured to extract second candidate vectors using the corrected first evaluation value table; and
   a detection unit configured to detect the motion vector from the first and second candidate vectors.

* * * * *